US010002356B2

(12) United States Patent
de Sylva

(10) Patent No.: US 10,002,356 B2
(45) Date of Patent: Jun. 19, 2018

(54) LOCATION AUGMENTED BIOTRANSACTION SYSTEMS AND METHODS

(71) Applicant: Robert Francis de Sylva, Santa Monica, CA (US)

(72) Inventor: Robert Francis de Sylva, Santa Monica, CA (US)

(*) Notice: Subject to any disclaimer, the term of this patent is extended or adjusted under 35 U.S.C. 154(b) by 0 days. days.

(21) Appl. No.: 14/089,770

(22) Filed: Nov. 26, 2013

(65) Prior Publication Data

US 2014/0081870 A1    Mar. 20, 2014

Related U.S. Application Data

(63) Continuation-in-part of application No. 13/136,162, filed on Jul. 23, 2011, now Pat. No. 8,595,075.

(51) Int. Cl.
*G06Q 20/20* (2012.01)
*G06Q 20/40* (2012.01)
*G06Q 20/32* (2012.01)

(52) U.S. Cl.
CPC ....... *G06Q 20/40145* (2013.01); *G06Q 20/20* (2013.01); *G06Q 20/3224* (2013.01)

(58) Field of Classification Search
None
See application file for complete search history.

(56) References Cited

U.S. PATENT DOCUMENTS

| 8,028,896 B2* | 10/2011 | Carter | G06Q 10/0633 235/379 |
| 2008/0046366 A1* | 2/2008 | Bemmel | G06Q 20/20 705/44 |
| 2009/0089155 A1* | 4/2009 | Fein | G06O 10/10 705/12 |
| 2014/0222685 A1* | 8/2014 | Middleton | G06Q 30/0261 705/50 |

* cited by examiner

*Primary Examiner* — Paul Danneman

(57) ABSTRACT

A biotransaction system and method. An example method includes receiving a first signal from a first device that is positioned at a first location, wherein the first device includes a biometric scanner adapted to scan biometric information of a first user and to use scanned biometric information to facilitate generating the first signal; employing the first signal to match information associated with the first user to information associated with a second user based on the information associated with the second user, resulting in a match in response thereto; and exchanging information between a first portion of a database associated with the first user and a second portion of a database associated with a second user in response to the match.

7 Claims, 14 Drawing Sheets

LOCATION AUGMENTED
BIOTRANSACTION SYSTEMS AND
METHODS

CROSS REFERENCE TO RELATED
APPLICATION

This application is a continuation-in-part OF U.S. patent application Ser. No. 13/136,162, entitled BIOTRANSACTION SYSTEMS AND METHODS, filed on Jul. 23, 2011, which is hereby incorporated by reference herein in full.

CROSS REFERENCE TO RELATED PATENT

This application is related to the following U.S. Pat. No. 7,743,980, entitled SYSTEM AND METHOD FOR FACILITATING MONETARY TRANSACTIONS, filed on Nov. 12, 2003, which is hereby incorporated by reference herein in full.

BACKGROUND OF THE INVENTION

Field of Invention

This invention relates to transactions. Specifically, the present invention relates to systems and methods for facilitating transactions, such as information exchange or delivery, via use of biometrics.

Description of the Related Art

Biometric systems are employed in various demanding applications, including e-passports, smart cards, keyless entry systems, and so on. Conventionally, biometrics are employed to facilitate user authentication, i.e., to verify identity and to enable a user to view data, enter physical locations or spaces, and so on.

An example biometric system enables viewing data in a database in response to a fingerprint scan authenticating a user. Such biometric systems may be incorporated into tokens, e.g., smart cards, e-passports, and so on, to facilitate viewing data in the tokens. However, such tokens may be undesirably susceptible to theft and hacking.

A need remains for a biometric system that mitigates inconveniences, such as risks of lost or stolen data, while simultaneously enhancing functionality afforded by the system.

SUMMARY OF THE INVENTION

An example method for implementing a biotransaction system may employ a server system, such as a computing cloud, to facilitate: receiving a first signal from a first device that is positioned at a first location, wherein the first device includes a biometric scanner adapted to scan biometric information of a first user and to use scanned biometric information to facilitate generating the first signal; employing the first signal to match information associated with the first user to information associated with a second user based on the information associated with the second user, resulting in a match in response thereto; and exchanging information between a first portion of a database associated with the first user and a second portion of a database associated with a second user in response to the match.

In a more specific embodiment, the first signal includes biometric information and first location information characterizes the first location. The information associated with the second user includes second location information characterizing one or more regions, such as designated in-store payment regions, that have been registered by the second user with a database. The database may be implemented via one or more servers that are accessible to the first device via the Internet.

The information exchanged between database portions of the first user and second user may include financial account information and a transaction total pertaining to an amount of funds to be transferred from a financial account of the first user to a financial account of second user in response to the first user submitting to a biometric scan via the first device at the first location when the first location is within the one or more regions as indicated by a comparison of the first location information with the second location information. Information identifying the transaction total may be included in the first signal in addition to biometric information and the first location information.

In an illustrative embodiment, the second user is a merchant, and the first user is a customer of the merchant. The first device includes a mobile computing device, such as a smartphone, and the first location information includes enhanced Global Positioning System (GPS) information, the accuracy of which has been increased over conventionally available GPS information, e.g., via use of indoor location technology.

The second location information includes information characterizing one or more regions within a property boundary used by the merchant to conduct commerce. The property boundary may include, for example, a boundary of a building, e.g., a store or other outlet, used by the merchant. The one or more regions may represent one or more payment regions, wherein each payment region may include a mechanism for limiting a number of customers entering the payment region. Each customer entering the payment region may be associated with a transaction amount representing a total price for one or more items to be purchased by the customer of the merchant.

An alternative example method for implementing a biotransaction system from the perspective of a mobile computing device includes employing a mobile computing device that is equipped with a bio scanner and a GPS receiver to provide location information and information derived from a biometric scan of a user to a network-coupled database, thereby initiating a transaction; and receiving a signal from one or more servers server hosting the network-coupled database in response to providing the location information and information derived from a biometric scan of a user to the network-coupled database. The signal may indicate, for example, a status of a transaction between a user of the mobile computing device and an entity (e.g., a merchant) associated with region (e.g., payment region) encompassing a location of the mobile computing device (e.g., when the user enters the payment region) indicated by the location information provided via the mobile computing device to the network-coupled database.

Hence, certain embodiments discussed herein are particularly suitable for leveraging preexisting computing cloud functionality (e.g., database and device connectivity functionality) and detailed location information coupled with biometric information to facilitate implementing biotransactions. Preexisting infrastructure and technologies, such as conventional or preexisting indoor location services may be leveraged to augment functionality of biotransaction systems.

For example, in biotransaction system that facilitates commerce, a user employing a mobile computing device equipped with bio scanning functionality and indoor location and Global Positioning System (GPS) functionality may employ mobile computing device location and biometric data to pay for products and services by essentially using the mobile computing device as a payment mechanism without the need to exchange payment information with the merchant at the point of sale.

By matching user payment information with registered retailers; an in-store user can, for example, swipe their finger on the bio scanner of their mobile computing device to trigger automatic crediting of a merchant account based on the position of the mobile computing device in one or more designated payment regions within the merchant's store. The merchant can receive payment confirmation from a database system with which the merchant is registered and with which a database associated with the user, i.e., customer, communicates. For example, the user may swipe their finger on a bio scanner while standing within a designated payment region to trigger automatic crediting of the merchant's account with a transaction amount computed while the user is standing in the designated payment region. This may eliminate the need for use of a conventional retail charging terminal.

Hence, strategic use of enhanced location information, e.g., microlocation information, may facilitate biometric transactions and obviate the need for a merchant to maintain a charging terminal. In an illustrative implement, a user may place items (e.g., with Radio Frequency IDentification (RFID) tags) in a bag for purchase. A checkout line may be gated (to define payment regions), such that one person is allowed within a space (i.e., payment region) defined by an entry gate and exit gate at any given time. The mobile computing device may employ the microlocation information in combination with automatically calculated purchase totals (e.g., as computed via an RFID scanner), to enable paying a merchant via a swipe of a finger on a bio scanner.

The finger swipe may effectuate a charge via the Internet, using financial account information that has been previously associated (e.g., by the user) with the swiped finger. In the example embodiment, the merchant will have registered the microlocation regions at a central database that receives the biometric signals and microlocation signals.

A further understanding of the nature and the advantages of particular embodiments disclosed herein may be realized by reference of the remaining portions of the specification and the attached drawings.

DESCRIPTION OF THE INVENTION

Figure 1:
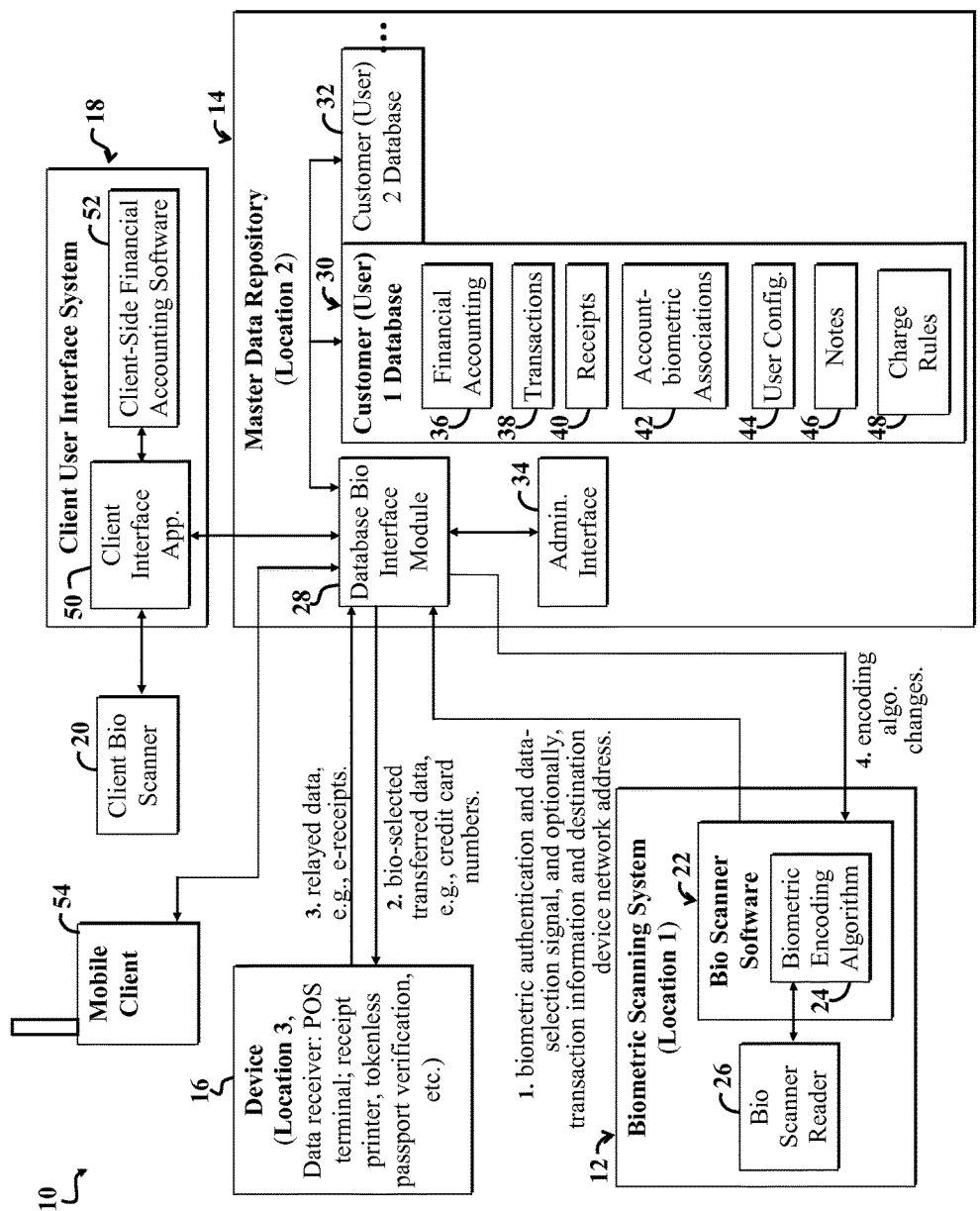
FIG. 1 is a diagram of a first example biotransaction system.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be useful.

For example, while various embodiments are discussed herein with respect to use of biometric information in communication with one or more Internet-accessible centralized databases to selectively dispatch remote functionality thereby or to control remotely positioned devices (e.g., printers, charging terminals, Automated Teller Machine terminals, and so on), embodiments are not limited thereto. For example, certain databases and functionality discussed herein may be adapted for use with mobile computing devices, such as mobile phones (e.g., smart phones), and accompanying databases without departing from the scope of the present teachings.

For the purposes of the present discussion, a transaction may be any process involving transfer of information from a first location or account to a second location or account. For example, a financial transaction may involve the transfer of funds from one bank account to another bank account. Similarly, an information transaction may involve delivery of information between locations. An example information transaction includes delivery of mail via the US Postal service, or the sending of an electronic message (email). A biotransaction may be any transaction that employs biometric information to facilitate implementation of a transaction.

Note that a location associated with a transaction need not be a geographical location. For example, a first location that is different than a second location may refer to a different field, record, or table in a database. For example, in this case, the first location may correspond to a first table, and the second location may correspond to a second table, which may or may not be in the same database. The second location is said to be different from the first location despite the fact that the first location and the second location may be on a single computer or memory storage device. For the purposes of the present discussion, a "location" of data may refer to any characteristic of data that is separate from the data itself, such as physical position, account association, and so on, that may be employed to differentiate data via mechanisms other than the data itself. A location of data may be described by metadata, whereby implementation of a transaction via the data (transfer between locations) effects a change in the location metadata.

A biotransaction system may be any collection of one or more components or modules (i.e., any system) that is adapted to implement or facilitate implementing one or more biotransactions, such as a financial transaction facilitated by biometric information, or a data-transfer transaction that employs biometric information to facilitate changing metadata data associated with given data, and so on. Biometric information may be any data characterizing or describing one or more biological features or characteristics, such as a fingerprint, iris pattern, vein pattern, facial dimensions, electromagnetic field profile (whether reflection-based and/or passive), and so on. Note that when biometric information is scanned and then scrambled or encoded via an encoding algorithm, e.g., scrambled with a hash code, or otherwise used to select or determine a code or key, the resulting encoded biometric information or selected code or key is also considered to represent biometric information. For example, a code that is selected via scanned biometric information is associated with the originally scanned biometric information by virtue of its selection thereby, and consequently, the selected code is said to characterize or describe the one or more biological characteristics obtained via the original biometric scan.

For clarity, various features, such as power supplies, network routers, computer operating systems, and so on, have been omitted from the figures. However, those skilled in the art with access to the present teachings will know which components and features to implement and how to implement them to meet the needs of a given application.

FIG. 1 is a diagram of an example biotransaction system 10 according to a first embodiment. The example system 10 includes a biometric scanning system 12, also called a bio scanning system, which communicates with a master data repository 14, also called a central database or simply a database. The database 14 communicates with a client user interface system 18 and a device 16 to which information is selectively delivered. For illustrative purposes, a mobile client 54, as may be implemented via a mobile computing device, such as an iPhone®, pocketPC, Blackberry®, Symbian device, and so on, is in communication with the master data repository 14. The master data repository 14 is implemented via one or more Internet Web servers, e.g., as may be implemented via a datacenter coupled to the Internet.

The bio scanning system 12 includes a biometric scanner 26, called a bio scanner, in communication with biometric scanning software 22, also called bio scanner software. The bio scanner software 22 includes machine-readable instructions, i.e., computer code, for implementing a biometric encoding algorithm and for interfacing with the database 14.

The data repository 14 includes a biometric interface module 28, also called a database bio interface module. The bio interface module 28 communicates with an administrator interface 34 and various customer databases, which include, for illustrative purposes, a first customer database 30 and a second customer database 32. Note that in practice, additional customer databases (sub-databases of the master data repository database 14) may be added for each new customer, i.e., user of the system 10, as discussed more fully below. The bio interface module 28 is adapted to interface the bio scanning system 12, the device 16, the mobile client 54, and the client user interface system 18 to the data repository 14.

Those skilled in the art will appreciate that the bio interface module 28 may be implemented via various mechanisms, such as web services, Application Programming Interfaces (APIs), and so on. For the purposes of the present discussion, a database may be any collection of data.

For illustrative purposes, the customer databases 30, 32 are shown including financial accounting software 36, repositories for storing transaction information 38, transaction receipts 40, associations between biometrics and different accounts or other information, user configuration information and parameters 44, any customer notes 46, user-configurable charging rules 48, and so on, as may be appropriate for a given implementation.

Note that more or fewer modules, records, tables, or other objects, may be included in the customer database 30 than those shown, without departing from the scope of the present discussion. Furthermore, the various modules 36-48 may be implemented via database tables, records, fields, and/or other objects, and/or groups thereof. In addition, certain customer database components 36-48 may be maintained separately from the master data repository 14, such as via one or more desktop applications or smart phone applications that are adapted to communicate with the master data repository 14 and appropriate customer databases 30, 32.

The client user interface system 18 includes a client interface application 50 in communication with client-side financial accounting software 52. The client interface application 50 is adapted to interface a client-side bio scanner 20 with the bio interface module 28 of the master data repository 14.

In the present example embodiment, the bio scanning system 12 is positioned at a first location; the master data repository 14 is positioned at a second location, and the device 16 is positioned at a third location. Note that the names of the locations may be altered. For example, the location of the master data repository 14 may be considered a first location, while the location of the device 16 may be considered a second location. The first location, second location, and third location may represent different physical, i.e., geographic locations. Note however, that the first location associated with the bio scanning system 12 and the third location associated with the device 16 may correspond to locations within different devices, but the devices may be positioned at a similar building or Point Of Sale (POS), as discussed more fully below. However, in the present example embodiment, the location of the master data repository 14 represents a different geographical location than the locations of the biometric scanning system 12 and the device 16.

For the purposes of the present discussion, a first device or module is said to be positioned remotely relative to a second device or module if the first device or module is not part of the same device or module as the second device. For example, a user cell phone may be considered to be positioned remotely from a separate POS terminal and bio scanner at a point of sale. A POS terminal may be any device employed at a point-of-sale to facilitate a financial transaction, such as to effect a purchase of a product or service.

In an example operative scenario, the biotransaction system 10 is adapted for implementation of financial biotransactions involving purchases of products and/or services. In the example operative scenario, the bio scanning system 12 may be located at a POS, and the device 16 may represent a credit card and/or debit card charging device. In the event that the device 16 is a charging device, the device 16 may include adaptations for receiving account charging information from the master data repository 14, such as credit card numbers, Personal Identification Numbers (PINs), security codes, expiration dates, and so on, as needed to implement a transaction. Furthermore, the device 16 may include a receipt printer that is configured to generate a print file of a receipt and to selectively forward the print file to the master data repository 14 to facilitate user record keeping. Note that the receipt print file or other electronic representation of a receipt may be forwarded to the master data repository 14 via the biometric scanning system 12 and the network (e.g., the Internet) connecting the master data repository 14 to the biometric scanning system 12 and device 16.

Note that for clarity, while the device 16 is shown as a single device, in practice, the device 16 may be implemented via plural different devices without departing from the scope of the present teachings. In addition, those skilled in the art with access to the present teachings may readily make modifications to one or more existing charging device(s) to electronically receive account information from the master data repository 14; to forward print files of receipts to the master data repository 14; to output transaction totals, and so on, without undue experimentation.

In the present operative scenario, a user wishing to make a purchase employs the device 16 to obtain a transaction total. Note that in certain alternative operative scenarios, as discussed more fully below, the transaction total, in addition to other transaction information, such as information indicating whether the charge is being made at a restaurant, sporting goods store, and so on, may be forwarded to the master data repository 14 to be stored in association with the user, i.e., customer making a purchase. Such transaction information may be stored in the transactions object 38 of the associated customer's database 30. For the purposes of the present discussion, an object may be any collection of data and/or functionality. Hence, an object may include software and/or data.

Note that for illustrative purposes, two customer databases 30, 32 are shown. Each of the databases 30, 32 is governed by a different customer. In certain implementations, the customers that have established the databases 30, 32, e.g., via registration, may be the only persons with access to the databases. Note that, in practice, additional customer databases may be included in the master data repository 14 as additional customers register for use of one or more features/functionality of the system 10.

In the present operative scenario, after a transaction total is determined via the device 16, the user, also called the customer, then submits to a bio scan, such as a fingerprint scan. Note that, for the purposes of the present discussion, a fingerprint may be any measurement of a biological characteristic associated with one or more digits of a hand or foot. Hence, an infrared scan that captures information of blood vessel distribution within a finger, thumb, or toe may be considered to be a type of fingerprint scan (as may be a scan of finger surface features and patterns, etc.). Similarly, the biometric, i.e., one more measurements associated with the infrared scan, may be called a fingerprint or a fingerprint biometric.

In practice, the bio scanner 26 may employ a biometric that includes selective samples (sampled values) from a three-dimensional surface scan of features on one or more digits of a user's hand in combination with selective samples from a scan of blood vessel features as determined with reference to an infrared scan of one or more digits of a user's hand. Note that the exact type of biometric or biometrics read by the bio scanner 26 is/are implementation specific. Those skilled in the art may readily employ different types of biometrics alone or in combination with other biometrics to meet the needs of a given implementation without departing from the scope of the present teachings.

The exact types and positions of samples measured by the bio scanner 26 may be determined in accordance with the biometric encoding algorithm 24 included in the bio scanner software 22. Note that one or more adjustments to the biometric encoding algorithm, as may be made by a user or administrator, as discussed more fully below, essentially results in an entirely different biometric (e.g., number) associated with the user, despite the user submitting the same digit or combination thereof to the bio scanner 26.

Hence, if one or more users believe that one or more biometrics have been stolen or compromised, the one or more biometrics may be changed by selectively adjusting the biometric encoding algorithm 24, as discussed more fully below.

Note that in certain implementations, changes to globally applicable (i.e., applicable to all users, scanning systems 12, and client interface applications 50 of the system 10) encoding algorithms may necessitate customer re-registration with the system 10, e.g., via the client user interface system 18. To avoid the need for re-registration, the initially registered biometric data may include a super set of biometric sample data. The encoding algorithm will then select data points from the super set of data in accordance with algorithm parameters. When the algorithm changes, the data points selected from the superset change, thereby obviating the need to re-register biometric data.

The client interface application 50 may be automatically updated with new encoding algorithms in response to control signals from the database bio interface module 28, which may be in response to adjustments triggered via the admin interface 34 or in response to automatic adjustments, as discussed more fully below. Those skilled in the art with access to the present teachings may readily implement such encoding algorithm update functionality in software running on various modules 24, 28, 34, 50, without undue experimentation.

Note that the biometric encoding algorithm 24 also includes instructions for determining how to encode samples and not just which samples to take. Various biometric encoding algorithms may be employed, and the exact choice of an initial encoding algorithm is implementation specific. Nevertheless, in the present example embodiment, the bio scanner software 22 is adapted to selectively rotate or change encoding algorithms in accordance with a predetermined schedule (or other scheme or mechanism), thereby further enhancing security. For example, if a hacker were able to determine the algorithm used by the biometric encoding algorithm at a given instance, such knowledge would later be useless to the hacker, since the algorithm may change. Note that an encoding algorithm may be randomly changed as needed, e.g., by simply adjusting one or more encoding parameters and/or methods/mappings employed thereby.

Such a schedule for changing or adjusting the encoding algorithm may be controlled by an administrator of the master data repository 14 via the administrator interface 34 and the bio interface module 28 running on the master data repository 14. Note that the selective changing of the specific encoding algorithm employed by the bio scanner software 22 may be omitted from an implementation without departing from the scope of the present teachings.

After selective samples representative of a biometric are obtained, e.g., via the biometric scanning system 12, and the samples are encoded and encrypted as desired by the biometric encoding algorithm 24, the resulting encoded metric (called the biometric herein) may act as both a database key (data-selection mechanism) and an authentication mechanism (for verifying user privileges) for selectively accessing and triggering delivery of appropriate data from the master data repository 14 to the device 16. Note that the data delivered from the master data repository 14 to the device 16 may include control signals, instructions, and so on, in addition to other types of data, for selectively triggering or activating functionality of the device 16, as discussed more fully below.

Note that associations between certain biometrics and certain data, such as account information, e.g., as maintained by the financial accounting object 36 and/or the account-biometric associations object 42, may be stored in the account-biometric associations object 42. Specific associations may be adjusted by a user via the client user interface system 18 and accompanying client interface application 50 after the user has been authenticated and registered. Authentication of a user, such as a first customer, to enable the user to access the database 30, may be implemented via conventional username and password mechanisms, and/or via biometric authentication. Biometric authentication may be implemented via the client bio scanner 20 in combination with the client interface application 50, which may include machine-readable instructions, such as user-interface software and hardware for enabling a user to provide appropriate biometric authentication information to the master data repository 14 via the bio interface module 28 thereof. Note that the client user interface system 18 and client bio scanner 20 or versions thereof may be implemented via mobile computing devices and accompanying applications, such as applications that may run on a smart phone or other mobile computing device. Furthermore, a version of the client user interface system 18 and accompanying client bio scanner 20 may be installed at a POS to facilitate customer registration with the system 10.

In certain customer/user registration implementations, a user may have a mobile computing application for implementing the client user interface system 18, but may lack the client bio scanner 20. In such situations, the bio scanner reader 26 of the biometric scanning system 12, or another biometric scanner positioned conveniently at points of sale or other locations, may be equipped with functionality for interfacing with the client user interface system 18 to facilitate customer registration with the system 10. Such functionality may include Bluetooth, cellular, or physical coupling mechanisms for loading scanned biometric data into the client user interface system 18 for use in registering with the system 10 via the bio interface module 28 of the master data repository 14.

In the present operative scenario, a user initially registers with the system 10. Registration may occur via the client user-interface system 18 or via another system that is adapted to enable a user to populate the various objects 36-48 as desired. For example, if a user will be using the system 10 for financial transactions, the registration process may involve populating the account-biometric associations object 42 by specifying associations between certain biometric measurements and credit card or debit card account information. Exact registration details are implementation specific and may readily be determined by those skilled in the art with access to the present teachings without undue experimentation. A user may also register for automatic transaction-receipt storage; for access to financial accounting functionality; for passport information-delivery functionality; and so on. During registration, a user may also select options to pay for use of services and functionality offered by the system 10, such as by transaction amount round-up, monthly service fee, per-use service fee, and so on, as discussed more fully below.

After registration, when the user submits to a bio scan via the bio scanner 26, the resulting biometric is transferred to the bio interface module 28 of the master data repository 14. The bio interface module 28 is adapted to determine, based on the biometric, to which database 30, 32 the biometric corresponds, and furthermore, to which object and information the biometric is intended to access for dispatch to the device 16. For example, in the event of a financial transaction, submission of a biometric via the bio scanner 26 results in dispatch of predetermined account information to the device 16. The dispatched predetermined account information may include, for example, a credit card number, expiration date, PIN, security code, identification of the type of currency to be used, and so on, that has been previously associated with the type of biometric that the user provided to the bio scanner 26. For example, if a user has previously associated a thumb biometric with a particular MasterCard account for use in financial biotransactions, as specified via the user-modifiable account-biometric associations object 42, then when a user provides the thumb to the bio scanner 26, the master data repository 14 will forward the requisite MasterCard account information to the device 16.

Note that associations between biometrics and data, e.g., account information, may represent more than associations between data. For example, an association between a given biometric and a given dataset may further represent an association between the biometric and functionality (e.g., financial transaction functionality) associated with the dataset being accessed. For example, associations between biometrics and credit card accounts may be further associated with financial transaction functionality.

Note that a user may selectively adjust associations of biometrics with different account information and associated functionality via the client user interface system 18. The client user interface system 18 may be implemented via a conventional personal computer or mobile computing device (e.g., iPad) that is in communication with the master data repository 14. The master data repository 14 may be implemented via one or more servers, as may be housed at a data center, that is/are accessible to the client user interface system 18 via the Internet. In this case, the client interface application 50 may be implemented, at least in part, via a browser and appropriate plug-in. Alternatively, the client interface application 50 may be implemented substantially by a browser, while other functionality may be implemented server-side, e.g., via the bio interface module 28. Examples of other functionality include registration functionality for facilitating user registration with the system 10; interfacing functionality for interfacing the client-side financial accounting software 52 with the master data repository 14, and so on.

In the present operative scenario, after appropriate account information is delivered to the device 16, the account information is used by the device 16 to make a charge to pay for the purchase of one or more desired products and/or services. If a user has registered for automatic receipt-lodging functionality (service), the receipt print file generated by the receipt printer of the device 16 is forwarded to the master data repository 14 for lodging in the customer receipt object 40. Note that a unique address code may be forwarded from the master data repository 14 to the device 16 along with the dispatched account information. This unique address code (e.g., Uniform Resource Locator) is then attached to the corresponding receipt print file to facilitate delivering the receipt to the receipts object 40 of the customer. Those skilled in the art with access to the present teachings may readily adapt a receipt printer to communicate with the master data repository 14 and to appropriately lodge receipts therein without undue experimentation. Exact implementation details are application specific.

Note that the term "register" as used herein may refer to an initial registration as well as subsequent user modifications to the customer database 30, which may affect how the system 10 behaves when handling certain transactions, as discussed more fully below.

Alternatively, in the present example operative scenario, the printing device (included in the device 16), which is adapted to forward the receipt print file to the master data repository 14, may instead (of sending the file directly to the master data repository 14) route delivery of the receipt print file (or other electronic representation thereof) to the master data repository 14 through the biometric scanning system 12. In this case the bio scanner software 22 may employ the user-submitted biometric as the unique code to facilitate access to the customer database 30 to enable lodging of the receipt file in the receipts object 40. The biometric information acts as a database key identifying the customer database 30 and the appropriate object. The nature of the transferred information, i.e., the print file, may be used by the customer database 30 to determine that the print file should be lodged in the receipts object 40. Furthermore, the database bio interface module 28 may be adapted to automatically forward copies of receipts to a user's desktop or mobile computing device, which may be implemented via the client user interface system 18.

Alternatively, the device 16 may be adapted to communicate directly with the mobile client 54 to facilitate storing of receipts on the mobile client 54 and/or to facilitate communications with the master data repository 14. Such receipt storage and transfer on/to the mobile client 54 may be implemented via Near Field Communications (NFC) technologies widely used for mobile payment applications.

Furthermore, in an alternative implementation, in situations where the biometric scanning system 12 lacks a communications link to the master data repository 14, the mobile client 54 and accompanying interfacing code may be used to implement a communications link and interface between the biometric scanning system 12 and the master data repository 14.

In addition, certain modules of the biometric scanning system 12 may be implemented via a mobile computing device, such as the mobile client 54. For example, the mobile client 54 could be equipped with a biometric scanner and bio scanner software 22. In this example scenario, a NFC chip in the mobile client 54 could be used to obtain a transaction total, or the transaction total could be entered manually. The user could then submit to a biometric scan on their mobile scanner to retrieve the credit card payment information (or other charging information) to the mobile client 54. The mobile client 54 could then use an NFC to transfer the charge information to a POS device, such as the device 16 for completion of a charge. Such a method represents a mobile payment method that may be more secure than currently available mobile payment methods that rely upon storing credit card or other charging information on a mobile phone, which could be lost, stolen, or readily hacked.

Use a phone transmitter to provide credit card information directly via inductive coupling through pre-existing credit card reading systems. The phone could then come equipped with a biometric scanner for implementing an embodiment of the patent invention.

Note that if a user has supplied charge-configuration rules and/or charge rules (as stored in the user configuration object 44 and/or charge-rules object 48) that effect transactions, the transaction implemented by the system 10 will be affected accordingly. For example, if a user has specified that charges made at sporting goods stores will employ the user's pre-determined MasterCard, and charges made at restaurant's will employ a user's specified Visa, these rules (e.g., functionality specifications) are stored in the user charge-rules object 48. When the database bio interface module 28 receives a predetermined biometric, it may reference the charge rules 48 of the customer database 30 to facilitate choosing and dispatching appropriate credit card or other charge information to the device 16 in accordance with the charge rules 48.

The user may employ the client user interface system 18 to make rule configuration adjustments to the customer's database 30. Note that a service fee may be charged by the proprietor of the system 10 (via the system 10) for use of such functionality, as discussed more fully below.

In the present example operative scenario, if the user made a purchase at a sporting goods store, e.g., as indicated by the predetermined location of the biometric scanning system 12, then this location information may be forwarded along with the biometric information from the bio scanner software 22 to the master data repository 14. The master data repository 14 then uses the location information and the biometric information, with reference to the user charge rules 48, to determine what account information to forward to the device 16. In this case, in the event of a sporting goods charge, the master data repository 14 would forward the user's specified MasterCard to the device 16 for charging. Note that the initial biometric information that is forwarded to the master data repository 14 to implement a given transaction may include destination address information, i.e., network address information associated with the device 16, to facilitate delivery of biometrically selected data to the appropriate device 16. The address information may be pre-stored in the bio scanner software 22 upon installation of the bio scanning system 12 in association with a particular destination device 16.

In an illustrative operative scenario, information pertaining to the initial transaction total is forwarded from the device 16 back to the master data repository 14. Alternatively, the biometric scanning system 12 may communicate with the device 16, and a transaction total may be routed to the master data repository 14 through the bio scanner software 22, thereby enabling the transaction total to be properly stored in the master data repository 14 in accordance with the supplied biometric information. In an alternative implementation where the device 16 forwards transaction total information directly to the master data repository 14, requisite database-key information may be included in the message sent from the master data repository 14 to the device 16. This database-key information or unique locator code (e.g., identifier) may enable deposit of information in the appropriate object of the customer database 30 and may restrict other modification or access privileges that can be made via use of the supplied database-key information.

If a user has enabled note-taking functionality, e.g. by subscribing to a note-taking service/functionality via the client user interface system 18 and the bio interface module 28, then the user may have the option to automatically lodge notes, which may be stored via the notes object 46, for each transaction. The notes may be manually entered, e.g., via a mobile application running on the mobile client 54 or via a note-taking interface in the biometric scanning system 12.

Alternatively, notes are automatically generated by the biometric scanning system 12. When the biometric scanning system 12 is installed at a particular location, various details, such as address information, GPS coordinates, store description, and so on, may be included in automatically generated notes that are stored via the notes object 46 in association with the corresponding biotransaction. A user may employ the client interface application 50 to adjust the types and sizes of notes that are automatically forwarded to the notes object 46 by the biometric scanning system 12. The ability to store notes via the notes object 46 may be particularly useful for documenting expenses related to business meetings, and so on, for tax documentation or other purposes.

The client user interface system 18 may be implemented via a mobile computing device, such as the mobile client 54, without departing from the scope of the present teachings. This may enable users to configure and access their customer database 30 as needed while shopping; to check associations between different biometrics or combinations of metrics and different financial accounts, to register biometric information via the bio scanner reader 26 and mobile client 54, and so on.

Information indicating which services/functionality a user has subscribed to or activated may be stored in the user configuration information object 44. If a user has subscribed to financial accounting functionality, then financial transactions facilitated by the system 10 may be documented and organized in accordance with predetermined financial accounting software. The financial accounting software may be included in the financial accounting object 36 and may facilitate generating expense charts, cash flow reports, preparation of taxes, and interfacing with the client-side financial accounting software 52, such as Quicken, Microsoft Money, and so on. The financial accounting software implemented via the financial accounting object 36 may include user-configurable functionality for automatically linking receipts (from the receipts object 40) with documentation, e.g., notes, financial categories, tax specifications, and so on, for each transaction implemented.

The client-side financial accounting software 52 may interface with the server-side financial accounting software 36 via the client interface application 50 and the bio interface module 28. Note that in certain implementations, the financial accounting software implemented via the financial accounting object or module 36 may represent full-featured server-side accounting software, thereby substantially obviating the need for the client-side financial accounting software 52. The server-side financial accounting software 36 may further include additional functionality, such as tax-completion functionality, such as functionality similar to that implemented via packages such as TurboTax®.

A user may choose to pay for use of various functionality (i.e., services corresponding thereto) in accordance with various payment options. The exact payment options offered are implementation-specific and may readily be altered without departing from the scope of the present teachings.

In one operative scenario, a user may employ the client interface application 50 to select to pay a monthly fee for each service subscribed to. For example, manual note taking functionality may be associated with one monthly fee; automatic note taking functionality may be associated with another monthly fee; financial accounting functionality may be associated with another monthly fee; receipt-lodging functionality may be associated with another monthly fee, and so on. Alternatively, or in addition, use of all services/functionality may be covered by a flat fee. The services/functionality subscribed to by a user may be documented in the user configuration object 44 or other object.

Alternatively, a user may choose to select a service payment structure in accordance with a flat per-use fee, e.g., $0.05. Corresponding documentation indicating such a payment structure may also be stored via the user configuration object 44.

Alternatively, a user may choose to employ charge-rounding functionality. With charge rounding functionality, for example, each charge a user makes via the system 10 may be rounded up to the nearest dollar or other increment. The difference between the initial transaction fee for a given purchase and the rounded-up amount represents the user's payment for one or more services/functionality to which the user has subscribed.

For example, the device 16 may be adapted to only initiate a charge via preexisting banking infrastructure, e.g., clearing houses, payment hosts, and so on, after a final total is transferred to the device 16 via the master data repository 14. The extra charge for the product/service may then be transferred to the bank account of the proprietor of the system 10, e.g., via an Automated Clearing House (ACH) transfer from the merchant's account to the proprietor's account. The additional charge may appear on a customer electronic receipt and may be implemented via separate transactions (e.g., separate from the charge for the item being purchased). Such implementation-specific details may readily be determined and implemented by those skilled in the art with access to the present teachings without undue experimentation.

Alternatively, the charge made via the device 16 for a given product/service is not rounded up before the charge is initiated via preexisting banking infrastructure. In this case, the master data repository 14 adds a corresponding charge (corresponding to the rounded difference) to the account that was used to make a given charge. In this case, the master data repository 14 may include charging functionality to initiate charges via preexisting banking infrastructure directly to pay for services by charging the rounded difference to the customer.

Furthermore, note that in certain implementations, the transaction total forwarded from the device 16 to the master data repository 14 for a given transaction may include more than two decimal points, such that the exact charge includes fractions of a cent. Conventionally, fractions of a cent may be truncated or rounded. In the present operative scenario, the master data repository 14 may collect information pertaining to fractions of a cent and initiate appropriate user charges when the fractions add up over a predetermined amount.

Note that optional rounding functionality implemented via the master data repository 14 to pay for one or more services need not be limited to rounding to the nearest penny or dollar. For example, rounding may be performed to the nearest even dollar amount; to the nearest five-dollar amount; to the nearest ten-dollar amount, and so on as needed. The exact choice of rounding options to be provided to users to pay for functionality/services is implementation specific and may readily be determined by those skilled in the art with access to the present teachings without undue experimentation. Furthermore, charge rounding functionality may be omitted without departing from the scope of the present teachings.

In an alternative operative scenario, the system 10 may be used for biotransactions other than financial transactions. Such transactions include, for example, delivery of driver's license information to a police officer's terminal; delivery of passport information to devices used by customs authorities, and so on, as discussed more fully below.

In a first alternative operative scenario, the device 16 corresponds to a networked police computing device. The police computing device 16 may include a handheld device or computer in an officer's patrol car. The police may also carry the bio scanning system 12, or alternatively, the user may carry the client bio scanner 20. Note that the bio scanning system 12 and/or client bio scanner 20 may be implemented via a user mobile computing device, such as an iPhone®, pocket PC, etc., in communication with a bio scanner. The bio scanner 26 and/or client bio scanner 20 may be interfaced with the mobile computing device (e.g., mobile client 54 and/or device 16), e.g., via Bluetooth, Universal Serial Bus (USB), or other connection mechanisms.

When a police officer asks to see a user's driver's license, the user may trigger automatic delivery of the driver's license information to the police officer's device 16 by submitting to a biometric scan via the bio scanner 26 in communication with the police officer's device 16, or via the mobile client 54 in communication with the client bio scanner 20. For example, the user may have configured the customer database 30 to store driver's license information in association with the biometric associated with the combination of the user's index and middle fingers. Hence, when a user places the index and middle fingers on the bio scanner 26, automatic dispatch of the driver's license information to the police officer's device 16 may occur.

Similarly, for a passport information transaction implementation, US Customs authorities may have a device 16 that is adapted to receive passport information that is dispatched thereto (from the master data repository 14) in response to submission of biometric information to the master data repository 14 via the biometric scanning system 12. Such an implementation may obviate existing problems with hacking of current biometric passports that include a computer chip, which can be maliciously manipulated or replaced to thwart authorities.

Note that the biometric scanning system 12 may communicate with the device 16 to obtain network destination address information associated with the device 16. This network destination address information may be provided to the master data repository 14 in combination with the biometric information to facilitate dispatch of the appropriate information to the device 16. Alternatively, network destination address information is predetermined and stored in the master data repository 14, such as via the bio interface module 28.

Note that a user may associate any type of information for dispatch to a separate device or location via the system 10 without departing from the scope of the present teachings. For example, a user may associate passport information with the index finger on one hand and/or the index finger on another hand. Note that single biometric, e.g., of a single digit, iris, and so on, or a combination of biometrics may be used to associate information in preparation for transfer to a desired device. Such additional data may be stored in the account-biometric associations module 42. Note that for the purposes of the present discussion, an account may refer to any type of data, and not just financial data (e.g., credit card account numbers, etc.). For example, an account may correspond to driver's license data; to passport data; or to any other type of data that will be incorporated for dispatch from the master data repository 14.

In an illustrative implementation the biometric scanning system 12 is adapted to detect a spoken voiceprint. The voiceprint may correspond to a user's predetermined code word or combination of code words, which have been previously registered with the master data repository 14. Note that the bio interface module 28 may include one or more algorithms for translating a received biometric into an appropriate database key for accessing information in a customer database 30 and for enabling user modification of data in the databases 30, 32. In such an implementation, the bio scanner software 22 and biometric encoding algorithm include machine-readable instructions for automatically determining when a user has supplied a voiceprint via the scanner 26. For example, the bio scanner 26 may have a button that can be pressed when a voiceprint is entered to selectively dispatch information to the device in response to the entry of the voiceprint. Alternatively, an acoustic sensor can detect when a person speaks into a biometric scanning microphone and provides a signal in response thereto indicating (to the bio scanner software 22) that a voiceprint is being submitted.

Voiceprint scanning technology that may be implemented via the bio scanner 26 may be adapted to sample voice data from inaudible acoustic frequency ranges and/or audible frequency ranges. The encoding algorithm 24 may be further adapted to detect recording artifacts and to reject recorded voices that have been supplied to the bio scanner software 22. This may facilitate thwarting identity theft, as may the sampling of inaudible frequency ranges and unique characteristics of a particular human voice.

To reduce fraud, the biometric scanning system 12 may further include a camera or other mechanism to capture an image of an individual that may be attempting fraud. For example, if the bio scanner software 22 detects recording artifacts in a supplied voice, this may trigger a camera on the biometric scanning system 12 to forward a picture along with location information and any other relevant information to a separate fraud-collection database in the master data repository 14. Alternatively, if the bio scanner software 22 can detect which user or customer whose identity may have been stolen, then the picture may be lodged with the particular user's database 30, 32. Note that such functionality may be omitted without departing from the scope of the present teachings.

Note that once the master data repository 14, biometric scanning system 12, client user interface system 18, and receiving device 16 have been set up, the resulting system 10 lends itself to a myriad of potential uses and adjustments. For example, a user may employ the client user interface system 18 to specify geographic charging rules for use of certain credit card accounts, debit card accounts, and so on. For example, if a user knows that they will only be using a particular card to make purchases within a predetermined geographical region, e.g., Los Angeles, Calif., the user may specify that all charges made to a particular card must occur at locations within Los Angeles. Such a specification may be stored in the charge rules object, i.e., module 48. In such a scenario, geographic information identifying or describing the locations of the device 16 and the biometric scanning system 12 may be forwarded to the master data repository 14 by the biometric scanning system 12 and or the device 16 during the transaction process. For example, geographic location information may be forwarded from the biometric scanning system 12 to the master data repository 14 along with encoded biometric information supplied by a user via the scanning system 12. The biometric scanning system 12 may be equipped with a Global Positioning System (GPS) receiver determining location information to be forwarded. Alternatively, the geographic location of the biometric scanning system 12 is predetermined and stored in the master data repository 14 for reference.

The myriad of potential uses and adjustments further includes, for example, implementation of tip-selection functionality. For example, a user may employ the client interface application 50 to configure the customer database 30 and accompanying charge rules 48 to facilitate tipping, e.g., at a restaurant. For example, a user may configure the charge rules 48 to assign a predetermined tip percentage, e.g., 20 percent, to a particular biometric, e.g., a pinky finger (also called little finger), which may represent the tip biometric. When a payment is made, e.g., to a restaurant for a dinner with a first biometric, subsequent swiping of the tip-biometric (e.g., pinky finger), will automatically add a charge for a tip computed based on the charge made with the first biometric and the tip percentage established by the user via the charge rules 48. In practice, changing the charge rules 48 to adjust a tip as needed may be performed via the client interface application 50 running on a mobile computing device, such as the mobile client 54. Hence, in an example operative scenario, a user dining at a restaurant may swipe one finger to pay a bill; another finger to pay a tip based on a predetermined percentage of the last transaction.

The myriad of potential uses and adjustments further includes, for example, double-swipe functionality. In certain scenarios, users may wish to view and confirm which credit card information (or other charge information) is being used for a biotransaction. When double-swipe functionality is activated (e.g., by a user via the client interface application 50 in communication with the database bio interface module 28), a first swipe (submission) of a particular finger or combination thereof may trigger dispatch of the charging information from the master database repository 14 to the device 16, which may be displayed via the device 16. A second swipe of the particular biometric acts to confirm the transaction. When the first biometric is received by the database bio interface module 28, and the customer database 30 is accessed, the database bio interface module 28 will determine, with reference to the charge rules 48, whether double-swipe functionality is activated. If double-swipe functionality is not activated, then a single submission of the biometric will be sufficient to both retrieve credit card information (or other charging information) and authorize the transaction simultaneously. Otherwise, double-swipe functionality is implemented. The bio scanner software 22 and database bio interface module 28 may be readily configured with appropriate code to implement an embodiment of the double-swipe functionality discussed herein without undue experimentation.

Figure 2:
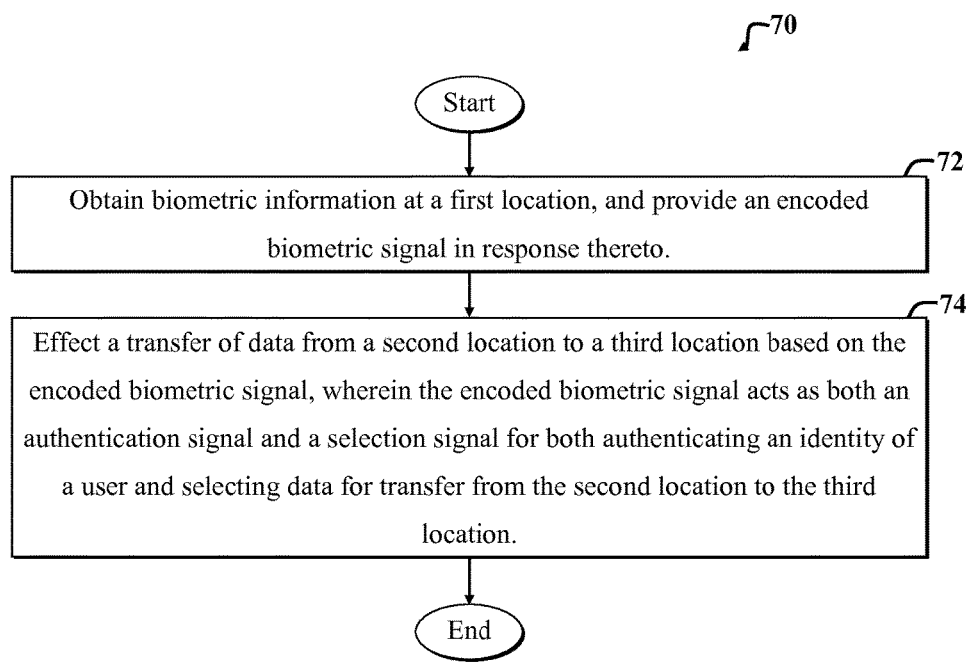
FIG. 2 is a flow diagram of a first method adapted for use with the biotransaction system of FIG. 1.

FIG. 2 is a flow diagram of a first method 70 adapted for use with the biotransaction system 10 of FIG. 1. With reference e to FIGS. 1 and 2, the first method 70 includes a first step 72, which involves obtaining biometric information at a first location and providing an encoded biometric signal in response thereto. The first step 72 may be implemented via the biometric scanning system 12 of FIG. 1, which may be located at the first location.

A second step 74 includes effecting a transfer of data from a second location, corresponding to the location of the master data repository 14 of FIG. 1, to a third location, corresponding to the location of the device 16 of FIG. 1, based on the encoded biometric signal. The encoded biometric signal, which is sent from the biometric scanning system 12 to the master data repository 14, acts as both an authentication signal and a selection signal for both authenticating an identity of a user and selecting data for transfer from the second location to the third location.

Note that conventionally, biometric signals are used for authentication rather than for both authenticating a user and simultaneously selecting a record or object from a database of a user. Furthermore, conventionally, once a user is granted access to data upon submission of biometric information, the biometric information (e.g., biometric-derived information) is not automatically transferred to a third location. Note that transfer of data to a third location in accordance with the present teachings may yield significant unobvious benefits, including enabling various functionality as discussed herein, such as remote passport, remote driver's license, remote credit card, and remote debit card functionality, and so on.

Accordingly, instead of requiring a user to carry tokens, such as smart cards, corresponding functionality may be implemented remotely, such as at one or more servers with significantly more computing resources and functionality-accommodating capabilities. Such remote functionality and capabilities, including storage of various types of data, may be remotely dispatched to different locations as needed. Such use of a remote server to trigger functionality via use of biometric information may be considered a type of biometric-based cloud computing augmented with remote device control, where the control signals are dispatched from a remote server to a disparate device (e.g., the device 16 to be controlled or influenced) in accordance with predetermined user-configurable instructions.

Figure 3:
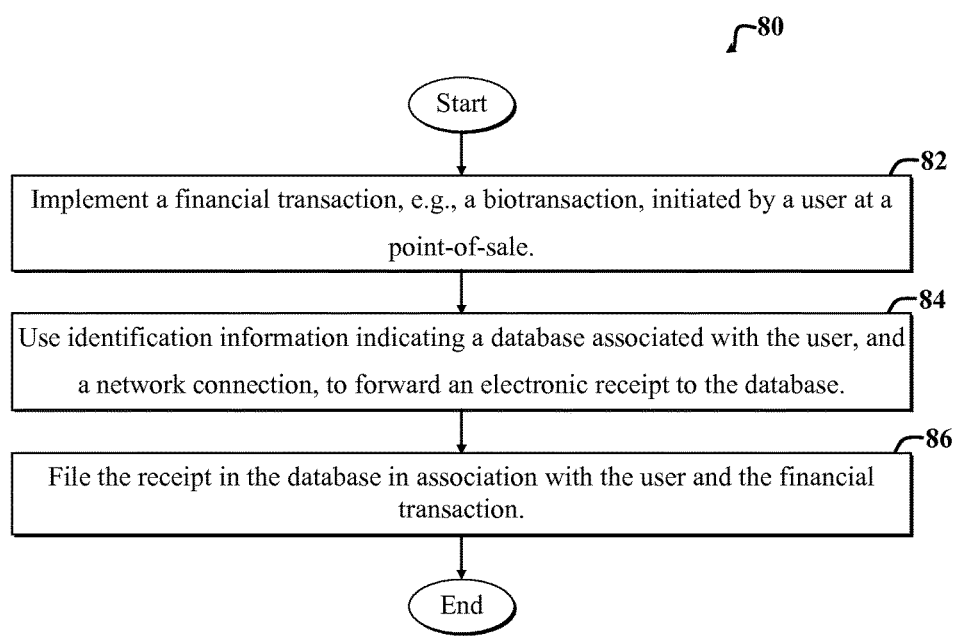
FIG. 3 is a flow diagram of a second method adapted for use with the biotransaction system of FIG. 1.

FIG. 3 is a flow diagram of a second method 80, which is adapted for use with the biotransaction system 10 of FIG. 1. With reference to FIGS. 1 and 3, the second method includes an initial step 82, which involves implementing a financial transaction, e.g., a financial biotransaction, initiated by a user at a POS. The POS location may be proximate to the location of the biometric scanning system 12. For example, the biometric scanning system 12 may be positioned in a store or other merchant facility along with equipment for implementing credit card charges, debit card charges, and so on, which may correspond to the device 16. In the present embodiment, the POS includes a POS terminal corresponding to the device 16 of FIG. 1.

The financial transaction implemented in the initial step 82 may be implemented in accordance with one or more biotransactions discussed above with reference to FIG. 1.

A subsequent step 84 includes using identification information to identify a database (e.g., the first customer database 30 of FIG. 1) associated with the user, and using a network connection to forward an electronic receipt to the database. The identification information, such as biometric information or a code generated therefrom or corresponding thereto, may further detail the object in the database 30 to which communications are intended. For example, in the case of a receipt transfer, the receipts object 40 would be identified for receipt storage.

A subsequent receipt-filing step 86 includes electronically filing the receipt in the database 30 in association with the user, i.e., customer, and in association with the financial biotransaction that was implemented. The receipt transferred to the receipts object 40 of FIG. 1 may include payload data detectable by the database 30 for facilitating organizing the receipt in association with a given transaction for use by the financial accounting software 36.

Figure 4:
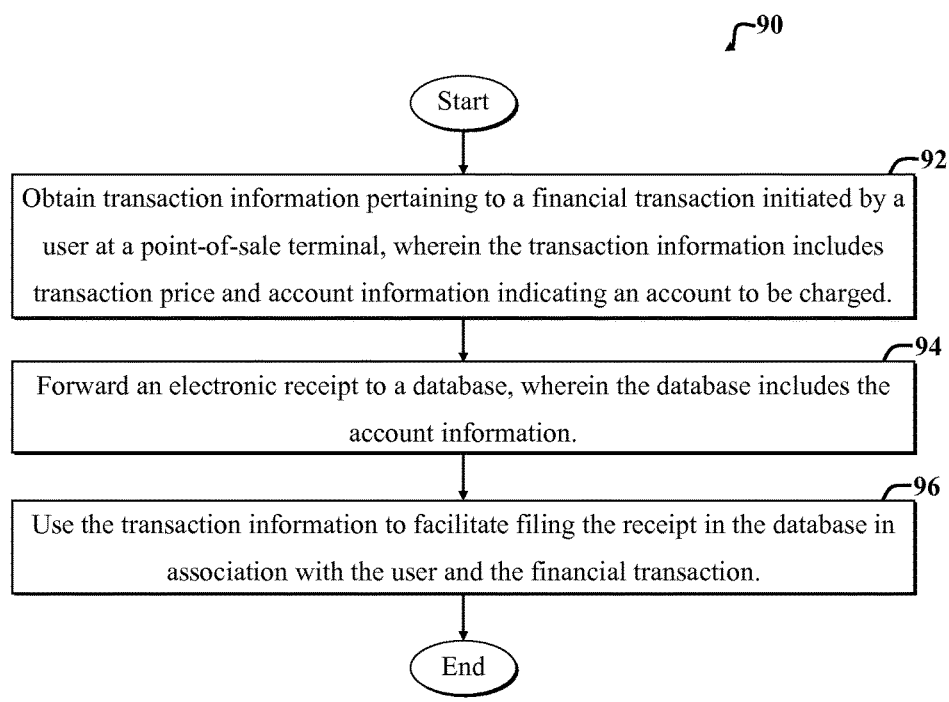
FIG. 4 is a flow diagram of a third method adapted for use with the biotransaction system of FIG. 1.

FIG. 4 is a flow diagram of a third method 90 adapted for use with the biotransaction system 10 of FIG. 1. With reference to FIGS. 1 and 4, the method 90 includes an information-gathering step 92, which involves obtaining transaction information pertaining to a financial transaction initiated by a user at a POS. In this case, the device 16 of FIG. 1 and the biometric scanning system 12 are located at a POS. Note that nevertheless, the biometric scanning system 12 may be considered to be at a separate location than the device 16, which may be a POS terminal, since the biometric scanning system 12 and the device 16 are implemented as separate functional devices or modules, although the devices 12, 16 may intercommunicate. In the present embodiment, the transaction information includes transaction price and account information indicating an account to be charged.

A subsequent forwarding step 94 includes forwarding an electronic receipt to a database, such as the first customer database 30 of FIG. 1, wherein the database includes the account information.

A subsequent filing step 96 includes using the transaction information to facilitate filing the receipt in the database in association with the user and the financial transaction.

Note that various methods described herein may be augmented or modified without departing from the scope of the present teachings. For example, the biometric used may include a voiceprint, which may include one or more code words. A mechanism may be provided for implementing steps, wherein a first previously registered biometric is disabled, and a new biometric is enabled for implementing biotransactions. The biometric may include a blood-vessel scan; a combination of a blood-vessel scan with another type of fingerprint or iris scan, and so on. The fingerprint scan may include a three-dimensional fingerprint scan that includes one or more sample data points associated with one or more surface features of a digit of a hand or foot, and so on.

Figure 5:
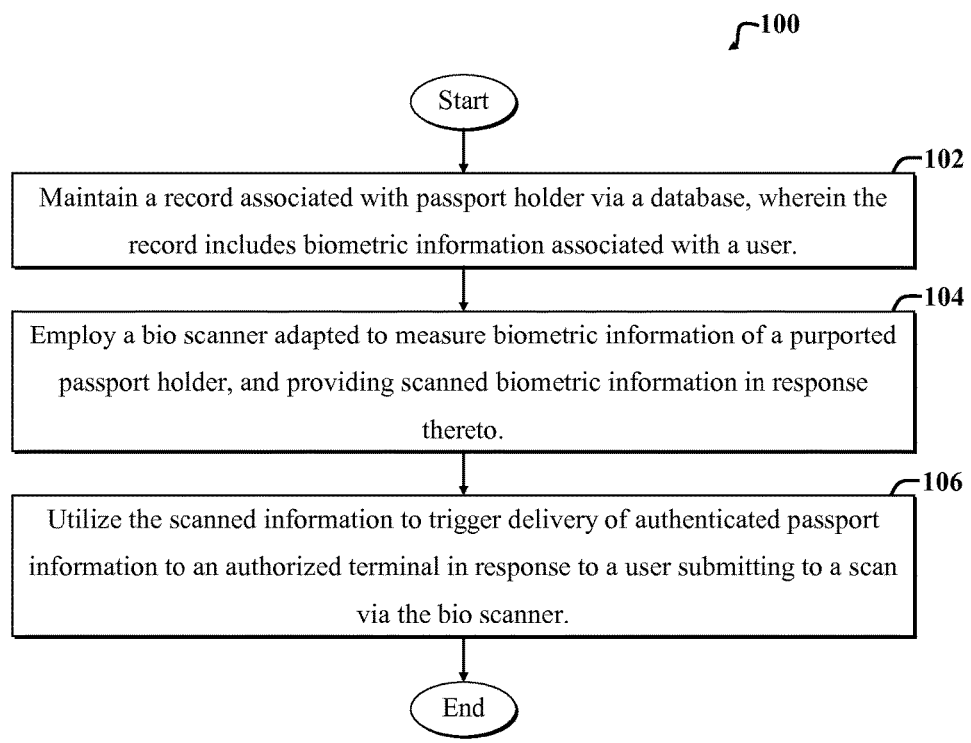
FIG. 5 is a flow diagram of a fourth method adapted for use with the biotransaction system of FIG. 1.

FIG. 5 is a flow diagram of a fourth method 100 adapted for use with the biotransaction system 10 of FIG. 1. With reference to FIGS. 1 and 5, the method 100 includes a passport-association step 102, which involves maintaining a database record associated with passport holder, e.g., a first customer, via a database, e.g., the database 30 of FIG. 1, wherein the record includes biometric information associated with a user. The passport record may be stored via a passport object included in the customer database 30. The passport object may be implemented, for example, by the biometric associations module 42 of FIG. 1.

A subsequent scanning step 104 includes employing a bio scanner, such as the bio scanner 26 of FIG. 1 and accompanying biometric scanning system 12, to measure biometric information of a passport holder, such as the first customer, and providing scanned biometric information in response thereto.

Next, a utilization step 106 includes employing the scanned biometric information to trigger delivery of authenticated passport information, e.g., from the customer database 30 of the master data repository 14, to an authorized terminal, e.g., the device 16 of FIG. 1, in response to a user submitting to a scan via the bio scanner.

Figure 6:
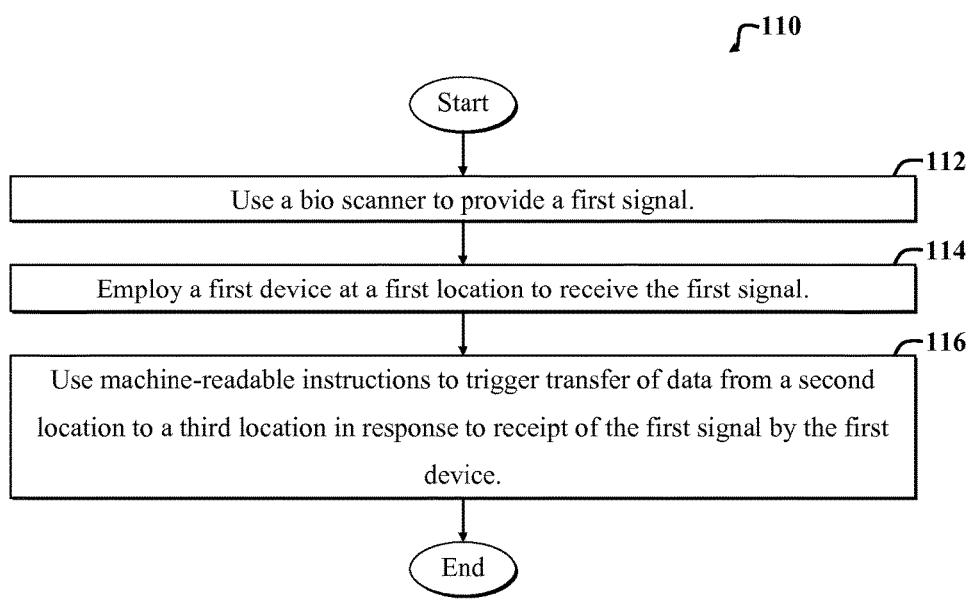
FIG. 6 is a flow diagram of a fifth method adapted for use with the biotransaction system of FIG. 1.

FIG. 6 is a flow diagram of a fifth method 110 adapted for use with the biotransaction system 10 of FIG. 1. With reference to FIGS. 1 and 6, the fifth method 110 includes an initial signal-providing step 112, which involves using a bio scanner, e.g., of the biometric scanning system 12 of FIG. 1, to provide a first signal, e.g., to the master data repository 14 of FIG. 1.

A subsequent receiving step 114 includes employing a first device, e.g., the master data repository 14 of FIG. 1, at a first location to receive the first signal. Note that the first device may include a computer running the bio scanner software 22 of FIG. 1 in an implementation where the bio scanner 26 is implemented as a device that is not built into a computer running the bio scanner software 22.

Next, a triggering step 116, which may be implemented via the master data repository 14 of FIG. 1, includes using machine-readable instructions, i.e., computer code (e.g., software) to trigger transfer of data from a second location to a third location in response to receipt of the first signal by the first device. The second location may correspond to the location of the master data repository 14, while the third location may correspond to the location of the device 16 of FIG. 1.

Note that the first location and the second location or the first location and the third location may be at similar geographic addresses but on different devices. The first device may include the bio scanner 26 of FIG. 1.

A second device, e.g., the master data repository 14, may be positioned at the second location. In the present example embodiment, a third device, e.g., the device 16 of FIG. 1, may be positioned at the third location; and the machine-readable instructions may be further adapted to facilitate transfer of the data from the second device (e.g., repository 14 and/or customer database 30) to the third device (e.g., the device 16).

The first signal may include biometric information. The second device may include instructions for employing the biometric information as an authentication signal and a data-selection signal to select data for transfer from the second device to the third device. In one implementation, the third device includes a printer, such as a receipt printer. Note however, that other types of devices, such as police ticket printers, printers for personal computers, and devices other than printers may receive dispatched data without departing from the scope of the present teachings.

For example, the third device to which information from the master data repository 14 is delivered may include a mobile computing device, such as a Windows Mobile® phone, iPhone®, other types of cellular telephones, and so on.

The database from which information is delivered may include financial account information, such as one or more credit card numbers. The third device may include a POS terminal.

Note that one operative scenario, information may be dispatched from the device 16 to the master data repository 14. In this case, the device 16 corresponds to the second device, while the master data repository 14 corresponds to the third device. Such an implementation may occur when the device 16 of FIG. 1 transfers a receipt of a transaction to the master data repository 14. Note that the transferred receipt need not be a print file, but may be another type of digital receipt, without departing from the scope of the present teachings.

The system 10 of FIG. 1 includes a mechanism for linking a receipt received by financial accounting software 36 maintained by the master data repository 14 with a financial transaction or charge indicated therein. The mechanism may include appropriate address and authentication signaling occurring between the master data repository 14 and device 16 of FIG. 1 in association with a given transaction. For example, during a communications session between the device 16 and the master data repository 14 initiated for a given transaction, the communications session may involve depositing a receipt into the receipts object 40 via a code provided by the master data repository 14 to the device 16 of FIG. 1, as discussed above with reference to FIG. 1.

Machine-readable instructions included in the master data repository 14 and the client user interface system 18 may provide a user with an option to limit locations to which information can be dispatched by the master data repository 14, i.e., to limit the third location to one or more locations or regions.

The bio scanner software 22 of FIG. 1 includes may include encoding algorithm 24 that is adapted to encode biometric information in accordance with a predetermined format. The exact format is implementation specific and may be readily determined by those skilled in the art with access to the present teachings without undue experimentation. Note that signaling between the various devices 12, 14, 16, 18, 54 of FIG. 1 may be encrypted by a desired encryption methodology, such as triple DES (Data Encryption Standard).

The bio scanner software 22 of FIG. 1 is responsive to signals from the database bio interface module 28 to selectively change the encoding algorithm and/or other methods (e.g., data sampling locations) employed by the biometric scanning system 12 to obtain biometric information from a user. Note that software running on the bio interface module 28 of FIG. 1 may be configured, e.g., via the administrator interface 34, to alter one or more algorithms and/or to alter other behavior employed by the bio scanner software 22 at predetermined time intervals or at a specific time.

Any changes to the bio scanner software 22 directed by the database bio interface module 28 of FIG. 1 are met with corresponding changes to the bio interface module 28 to enable the bio interface module 28 to use the resulting output from the biometric scanning system 12 to access and initiate dispatch of data and/or functionality corresponding to the biometric supplied to the biometric scanning system 12. Hence, the bio interface module 28 of FIG. 1 is said to include a mechanism for altering the encoding algorithm used by the biometric scanning system 12 at predetermined time intervals and another mechanism for adjusting the first device 12 and the second device 14 to enable processing of first signal output by the biometric scanning system 12 in response to a change in the encoding algorithm used thereby.

For the purposes of the present discussion, the term "access" does not necessarily imply modification ability. Database access as refers to the ability to observe data stored in the database or to copy data from the database, which can occur independently of database modification. Examples of database access include retrieving data from the database, selecting an account from the database according to biometric information, and so on. Hence, database access does not necessarily imply database modification. Instead, database modification may refer to changing data in the database or changing pre-established database behavioral rules, which may include, but is not limited to: deleting database entries, changing database entries, moving database entries, changing database indexes, changing existing biometric account-selection behavior and associated rules, and so on. Hence, retrieval of data from a database or selection of data in a database does not imply database modification. The term "user modifiable database" may refer to a database to which a user can effectively log on to make changes directly thereto. In certain embodiments disclosed herein the customer databases 30, 32 represent user-modifiable databases.

Figure 7:
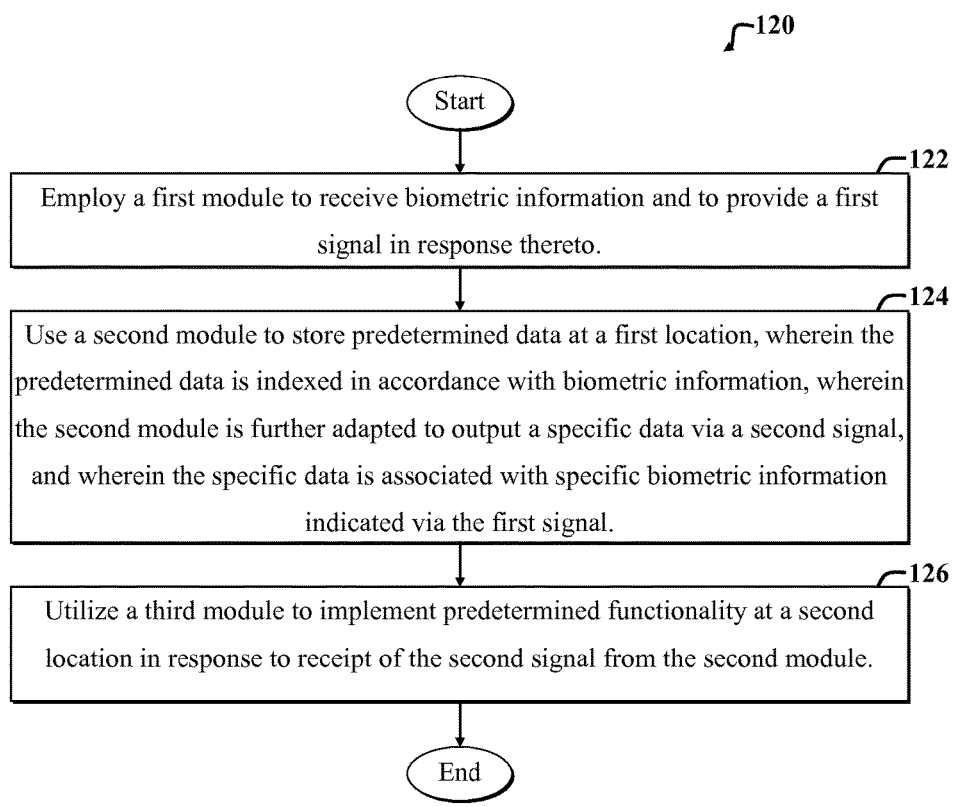
FIG. 7 is a flow diagram of a sixth method adapted for use with the biotransaction system of FIG. 1.

FIG. 7 is a flow diagram of a sixth method 120 adapted for use with the biotransaction system 10 of FIG. 1. With reference to FIGS. 1 and 7, the sixth method 120 includes an initial receiving step, which involves employing a first module, e.g., the biometric scanning system 12 of FIG. 1, to receive biometric information and to provide a first signal in response thereto.

A subsequent storing step 124 includes using a second module, e.g., the master data repository 14, to store predetermined data at a first location. The predetermined data, e.g., data stored in the customer database 30, is indexed in accordance with biometric information. The second module is further adapted to output a specific data via a second signal, e.g. to the device 16 of FIG. 1. The specific data is associated with specific biometric information indicated, i.e., identified by the first signal.

Next, a functionality-implementing step includes using a third module, e.g., the device 16 of FIG. 1, to implement predetermined functionality at a second location in response to receipt of the second signal from the second module.

Additional details may be added to the method 120 or removed therefrom without departing from the scope of the present teachings. For example, the first module may include a bio scanner, e.g., as included in the biometric scanning system 12 of FIG. 1. The first module may be adapted to encode scanned biometric information via a predetermined biometric encoding algorithm and may be further adapted to selectively alter the predetermined biometric encoding algorithm implemented via the first module. The second module may include a database, e.g., as included in the master data repository 14 of FIG. 1. The first location and the second location may represent different geographic locations that are different from a location of the first module. The first signal may act as an authentication signal and a database key for selecting the specific data maintained via the database. The third module may include a printer (e.g. as may be included in the device 16 of FIG. 1) for printing data contained in the second signal. The third module may include a point-of-sale terminal. Alternatively, the third module may include a passport identification system, and so on.

For the purposes of the present discussion, a passport identification system may be any computer system, device, module, and/or network for facilitating verifying the status of a passport or viewing or accessing information associated with or otherwise characterizing a passport.

Figure 8:
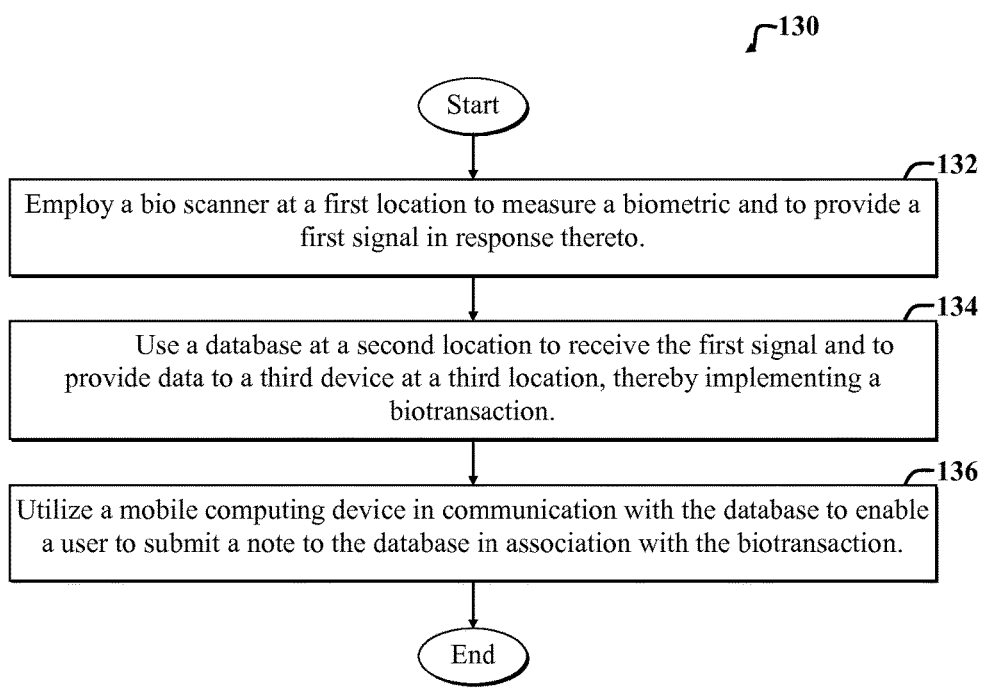
FIG. 8 is a flow diagram of a seventh method adapted for use with the biotransaction system of FIG. 1.

FIG. 8 is a flow diagram of a seventh method 130 adapted for use with the biotransaction system 10 of FIG. 1. With reference to FIGS. 1 and 8, the seventh method 130 includes an initial measuring step 132, which involves employing a bio scanner at a first location to measure a biometric and to provide a first signal in response thereto.

A subsequent database step 134 includes using a database at a second location to receive the first signal and to provide data to a third device at a third location, thereby implementing a biotransaction.

Next, an enabling step 136 includes using a mobile computing device, e.g., the mobile client 54 of FIG. 1, in communication with the database, to enable a user of the system (e.g., a user of the system 10 of FIG. 1), to submit a note to the database in association with the biotransaction.

Hence, users may now make personal notes for storage at a remote biometric/credit card server, e.g., via a mobile computing device, where the note describes, for example, the type of charge made. This may enable users to more accurately track purchases, such as small purchases, which users may otherwise easily forget about.

Figure 9:
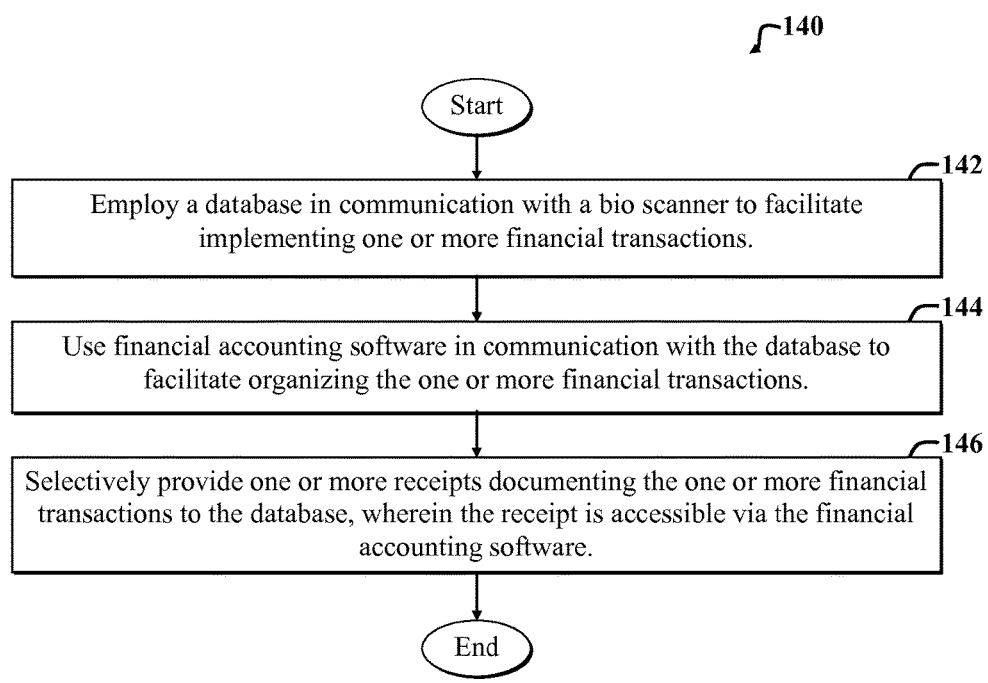
FIG. 9 is a flow diagram of an eighth method adapted for use with the biotransaction system of FIG. 1.

FIG. 9 is a flow diagram of an eighth method 130 adapted for use with the biotransaction system 10 of FIG. 1. With reference to FIGS. 1 and 8, the eighth method 130 includes a first transaction-implementing step 142, which involves employing a database, e.g., of the data repository 14 of FIG. 1, in communication with a bio scanner to facilitate implementing one or more financial transactions.

A subsequent accounting step 144 includes using financial accounting software, e.g., the financial accounting object 36, and client side financial accounting software 52 of FIG. 1, in communication with the database to facilitate organizing the one or more financial transactions.

Next, a digital receipt-providing step 146 includes selectively providing one or more receipts documenting the one or more financial transactions to the database, wherein the receipt is accessible via the financial accounting software.

Figure 10:
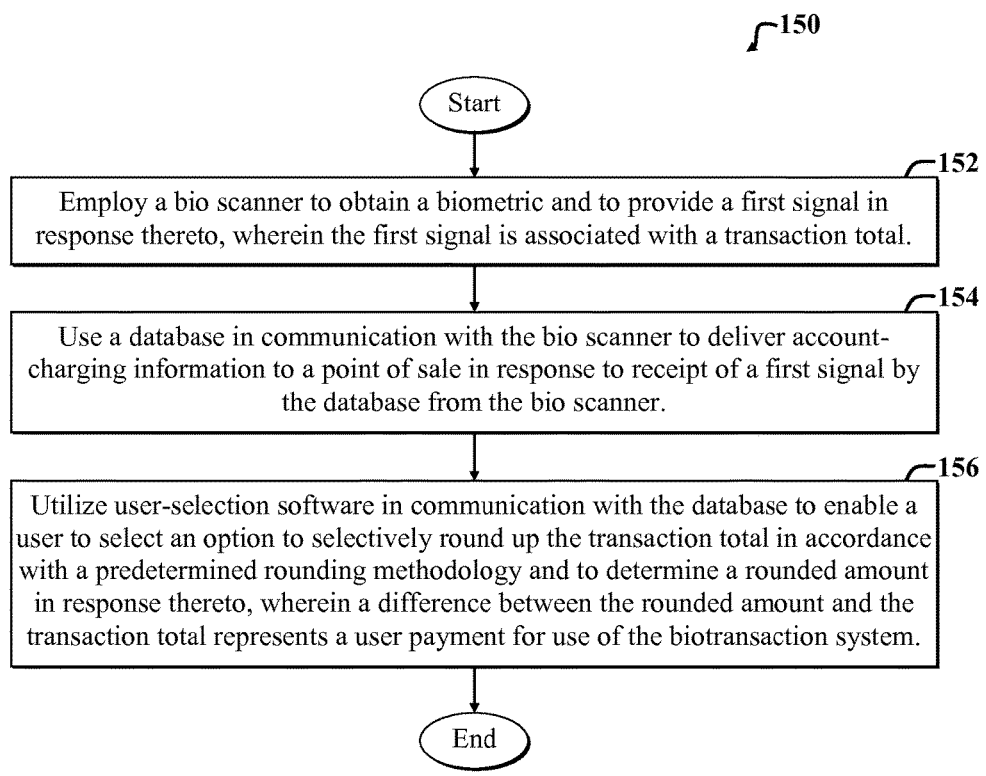
FIG. 10 is a flow diagram of a ninth method adapted for use with the biotransaction system of FIG. 1.

FIG. 10 is a flow diagram of a ninth method 150 adapted for use with the biotransaction system 10 of FIG. 1. With reference to FIGS. 1 and 10, the ninth method 150 includes an initial signal-providing step 152, which involves employing a bio scanner to obtain a biometric and to provide a first signal in response thereto. In the present embodiment, the first signal is associated with a transaction total, such as a total provided by the device 16 of FIG. 1 when the device 16 is implemented as a POS terminal. Note that the transaction total obtained by the device 16 of FIG. 1 may be forwarded to the biometric scanning system 12 for forwarding to the master data repository 14 in combination with biometric information supplied by a user.

Note however, that other implementations are possible. For example, instead of routing transaction information to the master data repository 14 through the biometric scanning system 12, the transaction information may be routed from the device 16 to the master data repository 14 after communications between the master data repository 14 have been established in association with the implementation of a biotransaction. Note that the master data repository 14 may have pre-stored address information, e.g., network Internet Protocol (IP) address information corresponding to the device 16 to facilitate communicating therewith to complete a biotransaction. The address information may be loaded to the master data repository 14 upon installation of the biometric scanning system 12 and associated destination device 16.

A subsequent delivery step 154 includes using a database in communication with the bio scanner to deliver account-charging information to a point of sale in response to receipt of a first signal by the database from the bio scanner.

Next, a user-selecting step 156 includes employing user-selection software (e.g., as may be implemented via the client user interface system 18 and the bio interface module 28) in communication with the database to enable a user to select an option to selectively round up the transaction total in accordance with a predetermined rounding methodology and to determine a rounded amount in response thereto. A difference between the rounded amount and the transaction total represents a user payment for use of the biotransaction system.

Note that the method 150 may include additional or fewer details and/or steps without departing from the scope of the present teachings. For example, an additional step may be added involving employing charging software in communication with the user-selection software and the database to implement the rounding methodology to collect payment for the service.

An additional step may include employing user-interface software in communication with the database to enable a user to selectively assign different biometrics to different accounts or groups of data associated with the user for implementation of one or more biotransactions.

Another example step includes employing a mobile computing device (e.g., the mobile client 54 of FIG. 1) in communication with the user-interface software to store one or more descriptions of one or more assignments of biometrics to one or more accounts and to selectively display one or more descriptions of the one or more assignments. This may help a user to remember assignments that the user has chosen. For example, if a user has associated a passport with a thumb; a driver's license with an index finger; a Master-Card with a thumb on an opposite hand, and so on, such assignments may be accessed via the mobile client 54 of FIG. 1 in certain implementations. Those skilled in the art with access to the present teachings may readily incorporate such functionality in the mobile client 54 and/or the master data repository 14 without undue experimentation.

Figure 11:
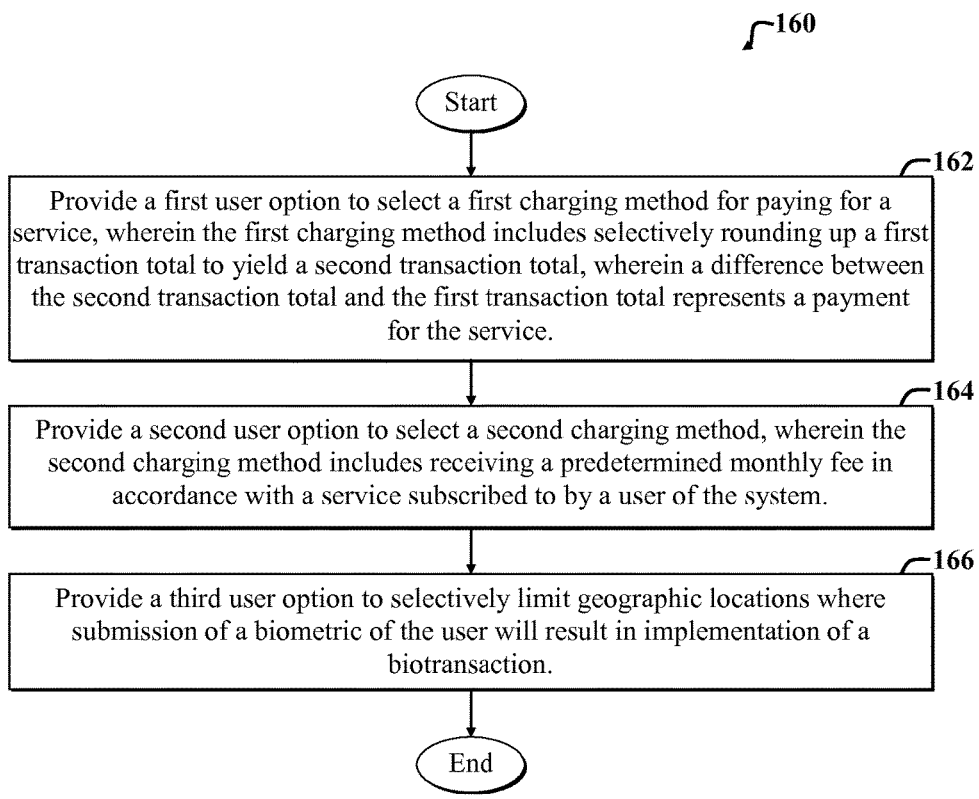
FIG. 11 is a flow diagram of a tenth method adapted for use with the biotransaction system of FIG. 1.

FIG. 11 is a flow diagram of a tenth method 160 adapted for use with the biotransaction system 10 of FIG. 1. With reference to FIGS. 1 and 11, the tenth method 160 includes an initial option-providing step 162, which involves providing a first user option to select a first charging method for paying for a service. The first charging method includes selectively rounding up a first transaction total to yield a second transaction total, wherein a difference between the second transaction total and the first transaction total represents a payment for the service.

A second option-providing step 164 includes providing a second user option to select a second charging method. The second charging method includes receiving a predetermined monthly fee in accordance with a service subscribed to by a user of the system.

Note that alternatively, a proprietor of the system 10 could charge users a per-transaction fee. For example, when a user's credit card information forwarded to the charging terminal, e.g., the device 16 of FIG. 1, the credit card could also be charged by the master data repository 14 in accordance with transaction information forwarded to the master data repository 14 from the device 16. The master data repository 14 could also charge for the receipt lodging service and other services via similar methods.

Alternatively, round-up functionality may be employed to charge for services, where the proprietor of the system 14 essentially keeps a user's spare change to pay for services subscribed to by the user. Round-off error, including fractions of a cent could also be tabulated and collected.

Various user payment options may be provided. For example options for round-up selection, fixed monthly fee selection, and so on, may be provided. The payment method may depend upon the service level selected, e.g., whether receipt storage, note-taking, financial accounting, and so on, are used.

A third option-providing step 166 includes providing a third user option to selectively limit geographic locations where submission of a biometric of the user will result in implementation of a biotransaction.

Functionality for implementing the steps 162-166 may be provided by the master data repository 14 and client user interface 18 of FIG. 1. Exact implementation details are implementation specific. Those skilled in the art with access to the present teachings may readily determine and implement appropriate details to meet the needs of a given application without undue experimentation.

Certain embodiments have been discussed herein involving selective transfer of data from one location to another where the transfer is initiated, authorized, and predetermined based on input biometric information. However, embodiments are not limited there to. For example, transfer of functionality, e.g., software and/or other computer-readable instructions may be transferred as a part of a transaction or exchange (e.g., exchange of data and/or functionality implemented via software) that is initiated via a first device and/or module, where the transfer occurs between a second device and/or module and a third device and/or module.

In one perceived implementation, an embodiment of the system 10 of FIG. 1 may be used to implement virtual wallets for users. Information associated with tokens normally carried in a wallet can be stored in the master data repository 14 of FIG. 1, and the information may be selectively dispatched to different devices and/or locations as need via different biometric input assigned to each token.

Alternatively, all of the tokens are assigned to or associated with one biometric, e.g., a biometric associated with a thumb or combination of digits.

Note however, that one biometric (e.g., as identified by a particular digit or combination of digits of a hand) may actually represent several sub-biometrics, since the encoding algorithm used to encode a given fingerprint, for example, may change. For example, the locations of samples taken may change as well as the algorithm used to encode the samples, thereby resulting in a different biometric code. Changes may automatically occur, or the changes may be directed by a user or other event. For example, if a user believes that a given thumb biometric has been stolen, the authorized samples associated with the possible stolen biometric may be restricted so that the possibly stolen biometric is no longer functional.

Furthermore, note that in a virtual wallet implementation, various information, such as representations of credit cards, representations of driver's licenses, and so on, may be printed via a remote printer in response to dispatch of the information to the printer from the master data repository 14 of FIG. 1. In such an implementation, the printer or a device coupled to the printer would be coupled to a network to enable communication with the master data repository 14 or an implementation thereof.

Such a networked printer could be specifically adapted to work with the system 10 and master data repository 14 of FIG. 1 and could be a product offered for sale by a proprietor of the system 10. Such a printer, for example, could be located in a person's automobile and could enable a user to automatically print insurance documents, for example, when needed. The printer could communicate with an in-car computer with Internet access. The computer could also be adapted to enable other features, such as Internet radio access, roadside assistance, navigation, and so on. The computer could also be a mobile computing device (e.g., a cellular telephone), such as the mobile client 54 of FIG. 1.

In another example embodiment, to reduce potential errors when using certain tokenless transaction systems that employ biometrics, a feature, i.e., functionality, may be provided via the master data repository 14 or other remote database, for enabling a user to specify not only geographical regions or specific merchants where charges are authorized and regions where they are not, but may enable a user to specify, for example, that only certain types of charges, e.g., charges for sporting goods, may be charged to certain cards.

An additional security mechanism may be provided wherein the system 10 of FIG. 1 sends an acknowledgement to a user's cell phone, e.g., mobile client 54 of FIG. 1, indicating when a charge has been made; when a charge has been attempted but was unsuccessful; where the charge and/or attempt was made, and so on. Such information may be graphically depicted on a user's computer or mobile computing device in certain implementations. In the present example implementation, a user may be provided an option, e.g. via a Graphical User Interface (GUI) running on the mobile client 54, to confirm a charge or to deny a charge made by a biotransaction system. Hence, a user may employ a mobile computing device as an added security measure to accept and/or reject charges and associated totals for purchases made at one or more points of sale. Such confirmation signaling between the mobile client 54 and the master data repository 14 may occur via text messaging, email, other network protocols and/or methods.

Note that certain embodiments discussed herein have described use of a periodically changing biometric encoding algorithm. Note however, that the encoding algorithm need not be periodically changed. Instead, for example, in certain implementations, the encoding algorithm and/or related biometric sampling method is only changed in the event that a user suspects fraud or otherwise suspects that a given biometric and/or account information has been compromised.

One perceived problem associated with use of biometrics is that if someone's biometric information, e.g., fingerprint information is stolen that they will be more severely disadvantaged than if a credit card number or other type of information were stolen. However, use of certain embodiments discussed herein substantially obviate this concern. For example, a two-dimensional image of a fingerprint need not necessarily be used and stored. Instead, different samples, e.g., of three-dimensional surface features; infrared signatures, and so on can be used, and the samples used to construct a biometric can be changed. Not only can the biometric data-sampling scheme be changed, thereby obviating the previous biometric, but also mechanisms may be provided to enable a user to change biometric parameters used.

For example, if a user believes that their thumb data has been compromised, the user may log into the master data repository 14 and disable their thumb biometric entirely. A user may choose to use a combination of biometrics instead, to access the data that was previously associated with the thumb biometric.

For example, a user can use a combination of biometrics (applied simultaneously and/or sequentially) to enable access to the user's database 30; then, the user may then change which biometrics may be used. For example, a different finger on a different hand may be used, while the thumb, for example, on another hand may be disabled. For instance, the thumbprint of an opposite hand might have been compromised. Furthermore, in an illustrative implementation, a different ink or portion of a fingerprint print may be used. As another example, a user may register just a fingertip. Such a registration may be sufficiently unique (for financial transaction purposes), especially if three-dimensional data, such as infrared scanning techniques, are also employed. Note that use of infrared scanning techniques may thwart efforts to make fake fingers to attempt fraudulent transactions. Furthermore, a user may wish to add a combination of a voiceprint and a fingerprint to enable transactions.

In a voiceprint implementation, a user registers voiceprints with their database, e.g., database 30, in the master data repository 14. The voiceprints could include verbalization of a particular code or sequence of codes. Use of voiceprints may be particularly useful for online purchases, where the verbal input is not at risk of being overheard. Even if a voiceprints code word or phrase is overheard, the code can be changed. Furthermore, an impersonator would have difficulty replicating a user's voice, especially if inaudible frequency ranges (as measured by a microphone with sufficient bandwidth capabilities) are used for the biometric sampling. A voice pint input device could contain technology to detect re-recording artifacts. Note that in certain implementations, a phone (if phone mode is enabled) could be used to input a desired voiceprint biometric; provided the sampling frequencies used to encode the voiceprint biometric are within the frequency band of the phone's audio encoder.

In addition, recall that location information pertaining to where an attempt to charge a disabled print occurs may be forwarded to the master data repository 14 and logged for future investigation. In addition, as set forth above, the biometric terminals may be equipped with cameras, enabling forwarding a photograph of a potential fraud perpetrator to the central database for further investigation.

Hence, use of the system 10 of FIG. 1 and implementations based thereon may provide a myriad of options that facilitate security, such as enabling a user to control charging location; to control the biometric or combinations of biometrics associated with different information and/or functionality; to control or adjust the biometric encoding algorithm used; to disable certain types of biometrics, such as the thumb (e.g., if the thumbprint may have been compromised); and so on. Note that certain implementations of the system 10 may be adapted for use with home biometric terminals and/or registration terminals set up at various locations, e.g., point of sale.

In implementations involving three dimensional surface scans of finger print features, the bio scanner 26 of FIG. 1 may take certain fingerprint groove-depth measurements; may measure certain thermal patterns emitted by the finger (not just blood vessel patterns); may selectively combine different types of measurements in a multi-modal system, and so on. Such techniques may provide sufficient distinguishing biometrics to facilitate implementations involving many users. The exact specifications and thresholds of uniqueness used to qualify a biometric are implementation specific and may readily be determined by those skilled in the art with access to the present teachings without undue experimentation.

Note that laser, acoustic reflection signatures, and other signatures as may be created via use of different frequency bands of electromagnetic energy, acoustic energy, and or other types of energy, are anticipated for use in future bio scanners. Doppler measurements, phase shifts, color, skin resistivity, and so on, may also be used.

Another illustrative embodiment involves use of special inks with different colors or optical properties. Such inks can be selectively applied to the fingers, thumb, etc., to enable certain transactions. For example, if a user's thumbprint is stolen, the user can adjust the parameters so that only a thumbprint with a special type of ink will be authorized. This specification can be combined with location restrictions so that, for example, only the thumbprints are allowed at stores within a given city, e.g., Santa Monica, or at a given merchant, e.g., Walmart®.

Note that while certain embodiments discussed herein employ receipt print files to document transactions, other methods for storing electronic copies or receipts are possible. For example, certain devices may be equipped with receipt scanners. Such devices could be interfaced with the master data repository 14, e.g., via the client user interface system 18 of FIG. 1 to enable a user to upload scanned receipts to the master data repository 14 to augment any receipts already stored therein. Furthermore, receipts forwarded from a POS device to the master data repository 14 need not be in the form of print files, but could represent scanned receipts, which may be stored via PDF files or other types of files. Furthermore, note that print files can readily be converted to different types of files, such as PDF, bitmap, and so on. Exact file formats are implementation specific and may be varied without departing from the scope of the present teachings.

In an illustrative embodiment, the mobile client device 54 may include a receipt scanner. For example, a camera on a mobile phone could be used to take a picture of a receipt. An application running thereon could automatically crop the photo and store the receipt. The receipt could then be forwarded to the master data repository 14 for use with financial accounting software, such as the server side accounting software 36 and/or the client side financial accounting software 52.

Hence, instead of or in addition to taking a printed receipt at a POS, users may opt to have the receipts transferred to their cell phone for download to their computer and/or to the master data repository 14.

In another illustrative embodiment, users of the system 10 of FIG. 1 may specify various additional configuration rules. For example, a user may specify that when a particular thumb biometric is submitted, that a maximum charge limit, e.g., $50 applies. In such cases, the master data repository 14 may block forwarding of the corresponding account information to the device 16 for charging if transaction information retrieved by the master data repository 14 from the device 16 indicates that the charge will surpass a predefined user-set threshold.

In another example scenario, a user could associate predetermined functionality to a particular biometric. For example, a user could specify that when a particular index finger is submitted for a biometric scan that $100 will automatically be withdrawn from an Automated Teller Machine (ATM) implemented via the device 16. Such specifications may be stored in the user configuration rules 44, which may then be used by the bio interface module 28 to control the progression of the associated biotransaction.

Note that various configuration rules and biometric associations maintained via the master data repository 14 may be selectively accessed by a user with an appropriately equipped mobile computing device, e.g., the client 54 of FIG. 1. In one implementation, an application running on the mobile client 54 is adapted to only access a portion of the master data repository 14, e.g., the account-biometric associations object 42 to view assignments that have been made by the user. Exact mechanisms for authenticating a user of a mobile computing device for access to the corresponding customer database of the master data repository 14 are implementation specific. For example, in certain implementations, a camera on a mobile phone could be used to photograph a thumbprint in detail, and an infrared port on the mobile computing device could obtain limited infrared information about the thumb. The combination of the thumbprint imagery and the infrared information could be used to generate a biometric to authorize the user for access to the user's database 30 and optionally, to make modifications thereto. Note that user access and database modification abilities may be set in accordance with how rigorous the authentication method being used is.

Note that a user need not access the master data repository 14 to view assignments in real time. In one embodiment, a user may employ the client user interface system 18 with more rigorous authentication and then generate a file indicating the assignments, where the file is then emailed or sent via text to the mobile client 54. Note that such assignment information need not include complete detail of account information, but could, in certain implementations, merely indicate that a MasterCard has been assigned to, for example, a right thumb biometric.

Hence, certain embodiments discussed herein can dispatch information from a database to any device, module, or functionality, e.g., to a printer, POS terminal, passport terminal, police computer, to a software application, and so on, in response to user submission of predetermined biometric information. For the purposes of the present discussion, a module may be any collection of functionality. Functionality may be any grouping of one or more functions, e.g., as may be implemented in software and/or hardware. Functionality may also include one or more services implemented or offered via the one or more functions.

In summary, the biotransaction system 10 of FIG. 1 may be used to implement various services pertaining to biotransactions, and some services that do not necessarily require use of biometrics (e.g., receipt storage service) but may nevertheless use biometrics.

Biometric information may be used as a database key, i.e., data and/or functionality selection mechanism, to select data and to trigger delivery of or transfer of a copy of the data from a remote database to a local site. Various uses include receipt storage and/or retrieval, e.g., in response to a transaction-complete signal sent from the device 16 to the master data repository 14.

Certain applicable business methods may involve enabling users to subscribe to various functionality, e.g., financial biotransactions service; note-taking service; passport service, and so on.

Biometric sampling and encoding methods and/or algorithms may be selectively altered in accordance with a desired scheme. Various devices, e.g., the device 16 that communicate with the master data repository 14 could also act as distributed moats, i.e., distributed sensors that selectively relay desired data back to the master data repository 14.

Various possible features in any given implementation of an embodiment may include enabling a user to limit allowable charge locations for a given account (e.g., to limit use of a given credit card to a particular location when used with the biotransaction system 10); enabling a user to restrict certain charges by merchant and/or merchant type; enabling rotation and/or user alteration of biometric encoding algorithms used; enabling a user to change portions of biometrics scanned (e.g., a user may limit a given finger biometric to finger tips in certain implementations); color-sensitive bio scanners may enable use of different colored metrics; a user could use different colored metrics on different days; different methods for paying for different services could be selected by a user; and so on.

Note that while the system 10 of FIG. 1 is discussed primarily with reference to a single user, i.e., a first customer that employs the first database 30 thereof, in practice, multiple customers, each with their own database may participate. In general, the user that configures a particular database may be the only person with access to that user's database. This may alleviate potential user concerns that their biometric information will be commandeered by various agencies.

The various embodiments described herein may be adapted to run on various processing systems, such as one or more computers. A data storage device, such as hard drive, may accommodate storage of data in the databases and/or storage of computer readable instructions for implementing various functionality described herein.

Figure 12:
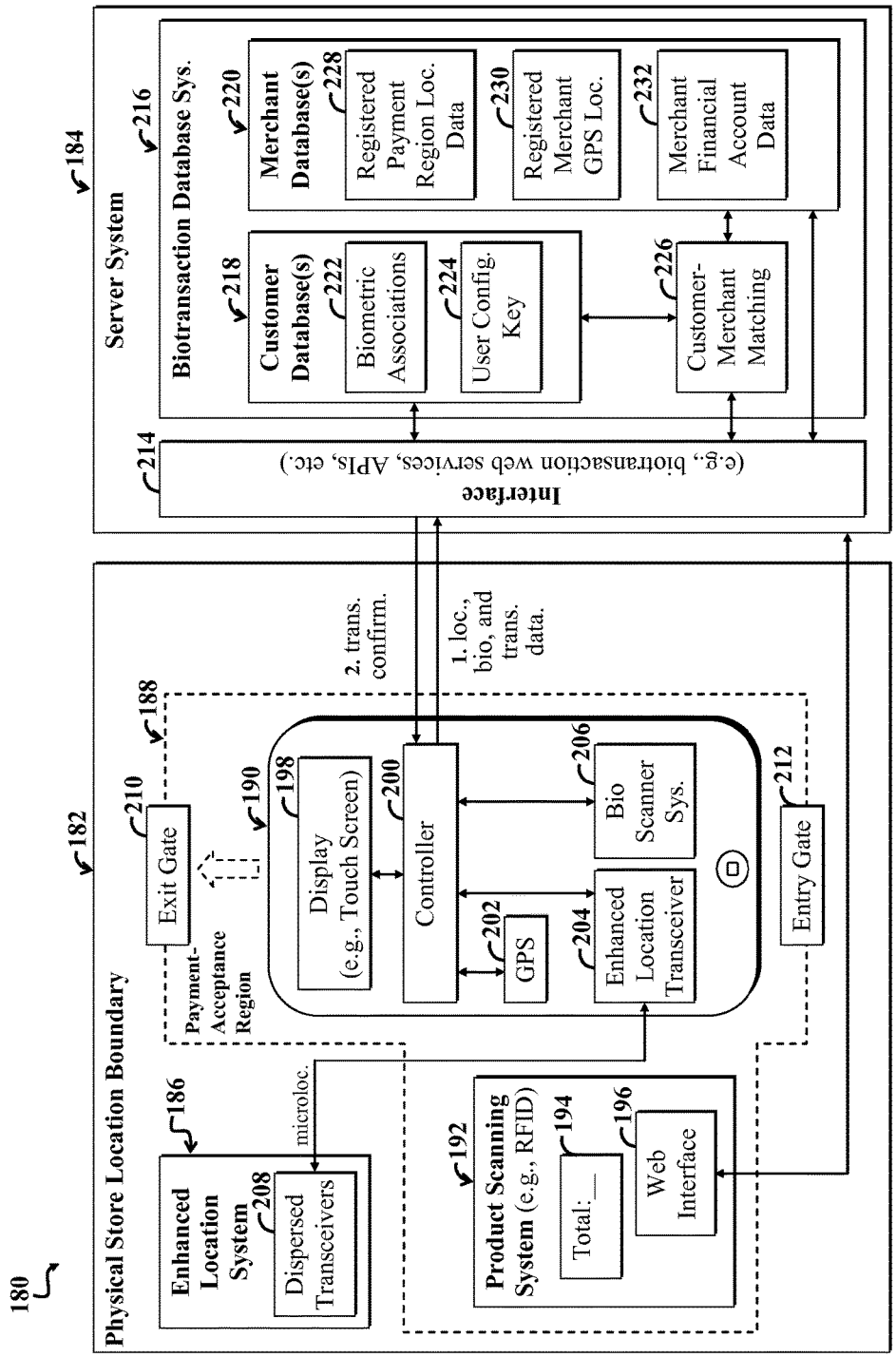
FIG. 12 is a diagram of a second example biotransaction system.

FIG. 12 is a diagram of a second example biotransaction system 180. The second example biotransaction system 180 is adapted to facilitate implementing a biotransaction involving payment for products and/or services to be purchased by a user of a mobile computing device (also simply called mobile device) 190 while at a physical store location 182, which may include a building and/or other property.

An example server system 184, which may be implemented via one or more servers, e.g., via a network computing cloud, is adapted to communicate with the mobile computing device 190 within the store location boundary 182. A pre-defined payment region 188, in which the mobile device 190 is located, is sectioned off within the physical store location boundary 182. The pre-defined payment region 188 includes an entry gate 212 and an exit gate 210 to ensure that only one person and associated mobile device is within the payment region 188 to make a purchase and associated payment.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

A mobile computing device may be any computer that is adapted for portable use. In general, a computing device may be any computer. A computer may be any processor coupled to memory. Examples of mobile computing devices include laptops, notebook computers, smartphones and tablets (e.g., iPhone, iPad, Galaxy Tab, Windows Mobile smartphones, Windows Phone smartphones and tablets, Android smartphones tablets, Blackberry smartphones, and so on), and so on. Various specific example embodiments discussed herein may employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

When a user of the mobile device 190 wishes to make a payment for products and/or services to a merchant associated with the physical store location boundary 182, the user enters the payment region 188. A product scanning system 192 may employ Radio Frequency Identification (RFID) tag scanning of products to compute a total 194.

The scanned total may be encoded and forwarded, via a scanning-system web interface 196, to the server system 184, where it is lodged in one or more of the merchant databases 220 in association with a transaction to be conducted. Alternatively, or in addition, the scanned total is forwarded to the mobile device 190, e.g., via WiFi, Bluetooth, Near Field Communication (NFC), or other known communication technologies.

Note that in implementations where the product scanning system 192 lacks a web interface, a camera of the mobile computing device 190 may be employed to photograph a displayed total 194. The resulting photograph is processed using Optical Character Recognition (OCR) and/or other image-matching technology to compute digits in the photograph into a text string representation of the total, which may be forwarded to the controller 200 for further use, as discussed more fully below.

After a user views or otherwise determines that the total is acceptable, the user may submit to a biometric scan via the bio scanner system 206. In the present example embodiment, upon receipt of encoded biometric information from the bio scanner system 206, the controller 200 activates computer code for enabling the enhanced location transceiver 204 (if it is not already activated) and the GPS receiver 202 (if it is not already activated).

The enhanced location transceiver 204 communicates with an enhanced location system 186, which includes dispersed transceivers 208, which are dispersed about the physical store location boundary 182. The dispersed transceivers 208 may include Bluetooth, WiFi (e.g., Institute of Electrical and Electronics Engineers 802.11 standard), and/or other signaling technologies that may be employed to exchange signals with the enhanced location system 186 and the enhanced location transceiver 204 of the mobile device 190 to facilitate determining a refined or enhanced-accuracy (i.e., more precise within the physical store location boundary 182 than location information determined based on use of the conventional GPS receiver 202) location information. The enhanced location computations may be performed at the enhanced location system 186 and then forwarded to the enhanced location transceiver 204, or alternatively determined via the enhanced location transceiver 204.

The enhanced location transceiver 204 then forwards the enhanced location information 204 to the controller 200. In certain implementations, the enhanced location information forwarded to the controller 200 from the enhanced location transceiver 204 may represent relative coordinates relative to one or more reference points within the physical store location boundary 182. These relative coordinates may be combined with location information derived from the GPS receiver 202 to generate a composite location signal. The composite location signal is also considered to be an enhanced location signal.

For the purposes of the present discussion, an enhanced location signal may be any signal that conveys enhanced GPS information. Enhanced GPS information may be any location information that provides improved location accuracy or resolution relative to that available via the GPS receiver 202 and associated GPS satellite system alone. Enhanced GPS information may be derived by combining microlocation information with conventional GPS information obtained from a GPS receiver of a mobile computing device.

Microlocation information, sometimes called indoor location information, may be any location information specifying information characterizing a location relative to an interior of a property boundary, such as coinciding with walls of a building. Enhanced GPS information may provide a higher location tolerance or precision than that available from a preexisting satellite-based GPS system.

Accordingly, in certain implementations, the microlocation information provides relative information, e.g., location information relative to the boundaries of a building. This relative location information may be coupled with a known GPS location of a position of the building (or part thereof) to generate the enhanced GPS information.

Note that indoor location services and accompanying systems and methods for employing mobile devices to receive utilize enhanced GPS location information are known in the art and may readily be adapted for use with various embodiments discussed wherein without undue experimentation, and without departing from the scope of the present teachings.

In the present example embodiment, the mobile device 190 combines enhanced location information and biometric information (e.g., representing a biometric-based user authentication and account-selection code) in one or more signals (1.) forwarded to the server system 184. The server system 184 includes front-end biotransaction interface 214 that is adapted (e.g., via one or more web services, Application Programming Interfaces (APIs), etc.) to employ the one or more signals (1.) to select a user financial account (e.g., with reference to biometric associations 222 in the customer database 218) for the purposes of implementing a financial biotransaction. The customer database may be determined by the interface 214 with reference to the user configurable key 224 representative of the biometric information portion of the one or more signals (1.) forwarded from the mobile device 190 to the server system 184.

The enhanced location information in the one or more signals (1.) is further employed by the biotransaction interface 214 and an accompanying customer-merchant matching module 226 to match the transaction to be implemented with the merchant associated with the enhanced location information. This matching may be performed by comparing pre-registered merchant location information 230 and associated payment regions or zones 228 at the merchant location corresponding to the location information 230. The pre-registered merchant location information 230 and accompanying region data 228 facilitate identifying one or more zones or payment regions (e.g., corresponding to the payment region 188) and then determining if the enhanced location information provided by the mobile device 190 represents a location within one or more of merchant-registered the payment zones or regions, as indicated by registered payment region location data 228. This matching enables selection of a merchant for completing the financial biotransaction used to enable the user of the mobile device 190 to pay for products and/or services.

Note that in certain implementations, the product scanning system 192 may simultaneously alert its associated database 220 to expect a signal from the mobile device 190 to further facilitate matching the user of the mobile device 190 with the merchant who has registered the payment region 188.

Transaction information, such as product price totals may be forwarded by the mobile device 190 to the server system, and/or by the product scanning system 192 to the server system 184. After computer code running on the customer-merchant matching module 226 matches the user with the merchant; determines which user financial account is associated with the submitted biometric information; and determines which merchant financial account 232 is associated with the payment region 188, then computer code running on the customer-merchant matching module 226 may send a signal to a clearing house or other network to facilitate implementing a funds transfer between the merchant financial account (as indicated by the merchant financial account data 232 and a biometric-selected user account (e.g., credit card account).

Figure 13:
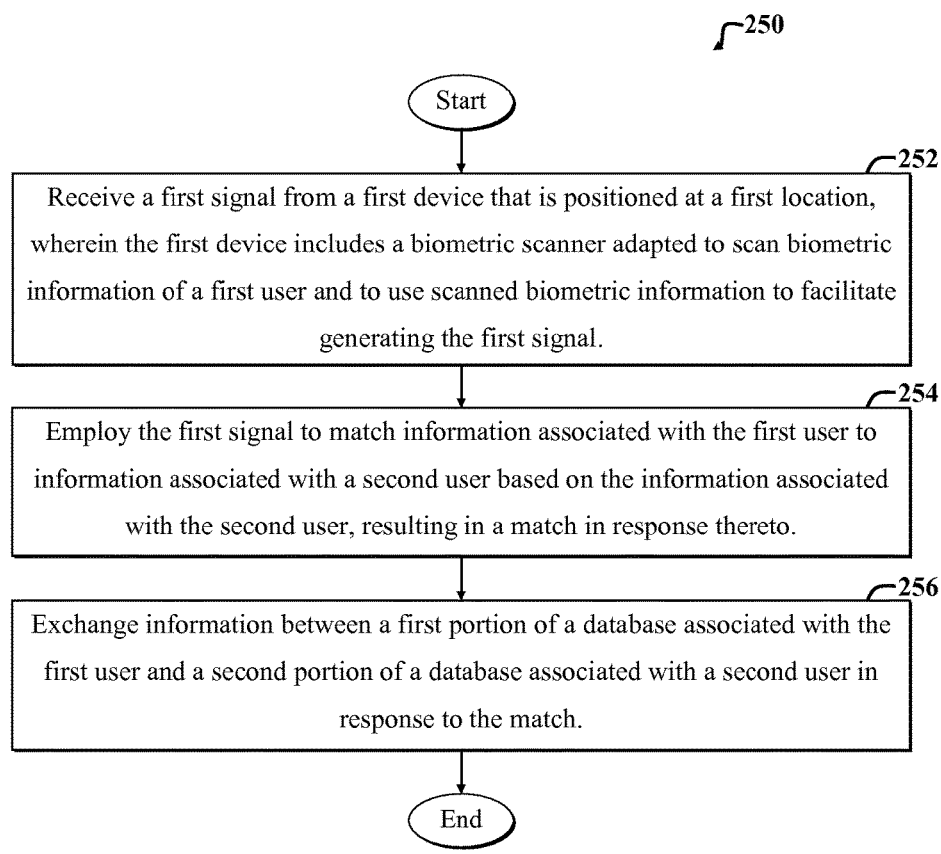
FIG. 13 is a flow diagram of an eleventh method adapted for use with the biotransaction system of FIG. 12.

FIG. 13 is a flow diagram of an eleventh method 250 adapted for use with the biotransaction system 180 of FIG. 12. The example eleventh method 250 includes a first step 252, which involves receiving a first signal from a first device (e.g., mobile device 190) that is positioned at a first location, wherein the first device includes a biometric scanner adapted to scan biometric information of a first user and to use scanned biometric information to facilitate generating the first signal (e.g., signal (1.) of FIG. 12).

A second step 254 includes employing the first signal to match information associated with the first user to information associated with a second user (e.g., a merchant running a business at the physical store location 182 of FIG. 12) based on the information associated with the second user, resulting in a match in response thereto.

A third step 256 includes exchanging information between a first portion of a database (e.g., the biometric associations portion 222 of FIG. 12) associated with the first user and a second portion (e.g., the merchant financial account data 232) of a database associated with a second user in response to the match.

The example method 250 may include additional details or may otherwise be modified, without departing from the scope of the present teachings. For example, the first signal may include biometric information and first location information characterizing the first location. The information associated with the second user may include second location information characterizing one or more regions (e.g., region 188 of FIG. 12) that have been registered by the second user with a database. The database (e.g., biotransaction database 216 of FIG. 12) may be implemented via one or more servers coupled to the Internet and accessible to the first device thereby.

The exchanged information may include financial account information and a transaction total pertaining to an amount of funds to be transferred from a financial account of the first user to a financial account of second user in response to the first user submitting to a biometric scan via the first device at the first location when the first location is within the one or more regions as indicated by a comparison of the first location information with the second location information.

The information identifying the transaction total may be included in the first signal in addition to biometric information and the first location information. The first location information may include enhanced GPS information. The second location information may include information characterizing one or more regions within a property boundary used by the merchant to conduct commerce.

The property boundary of the merchant includes a boundary of a building used by the merchant. The one or more regions may represent one or more payment regions, wherein a payment region of the one or more payment regions includes a mechanism adapted to facilitate limiting a number of customers entering the payment region. Each customer entering the payment region may be associated with a transaction amount representing a total price for one or more items to be purchased by the customer of the merchant.

Figure 14:
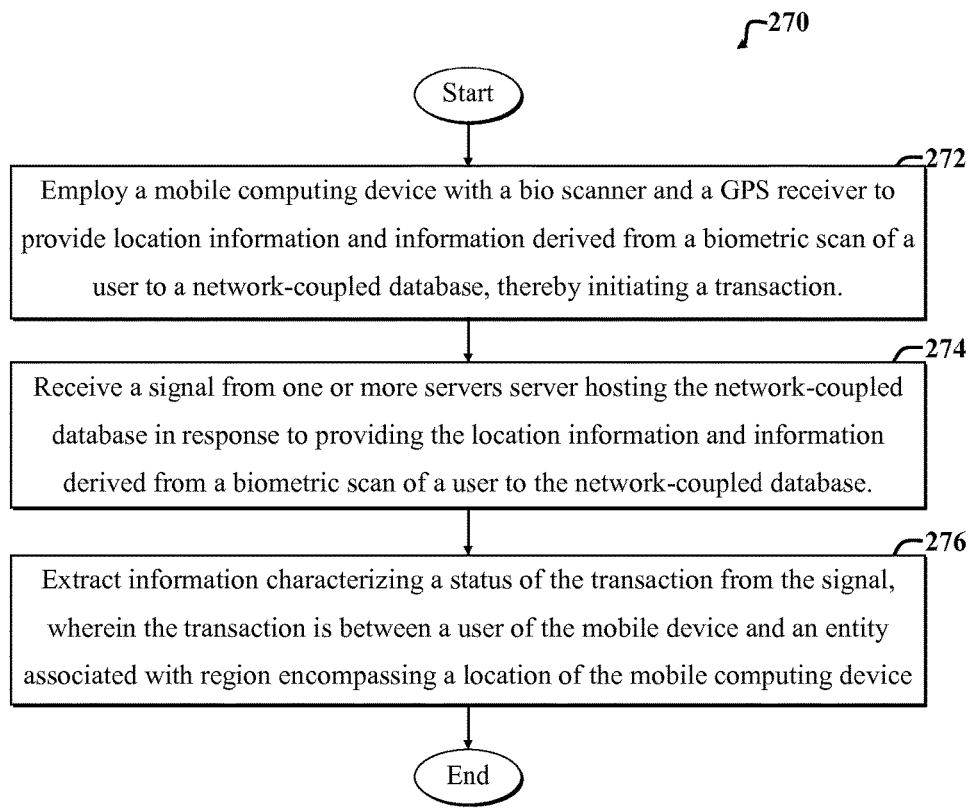
FIG. 14 is a flow diagram of a twelfth method adapted for use with the biotransaction system of FIG. 12.

FIG. 14 is a flow diagram of a twelfth method 270 adapted for use with the biotransaction system of FIG. 12. The twelfth example method 270 may be implemented from the perspective of a mobile device and includes an initial employing step 272, which involves employing a mobile computing device with a bio scanner and a GPS receiver to provide location information and information derived from a biometric scan of a user to a network-coupled database, thereby initiating a transaction.

A subsequent receiving step 274 includes receiving a signal from one or more servers hosting the network-coupled database in response to providing the location information and information derived from a biometric scan of a user to the network-coupled database.

Next, an information-extracting step 270 includes extracting information characterizing a status of the transaction from the signal. The transaction may be between a user of the mobile device and an entity associated with region encompassing a location of the mobile computing device indicated by the location information provided via the mobile computing device to the network-coupled database.

Those skilled in the art will appreciate that the example method 270 may be varied or replaced with a related method or system, without departing from the scope of the present teachings. For example, an example system includes a bio scanner adapted to provide a first signal; a first location determination mechanism adapted to facilitate determining a first location of a device coupled to the bio scanner; a server system at a second location, wherein the server system is adapted to receive the first signal and location information characterizing the first location; and machine-readable instructions adapted to trigger transfer of data from a third location to a fourth location in response to receipt of the first signal by the server system, wherein the third location is associated with a user of the bio scanner, and wherein the fourth location is associated with a region within which the bio scanner resides as indicated via the location information characterizing the first location.

While certain embodiment discussed herein that employ enhanced GPS location information are discussed with reference to financial or commerce transactions, embodiments are not limited thereto. For example, certain methods discussed herein may be employed to facilitate a transaction between different database registrants, where the transaction could be other than a financial transaction. For example, certain embodiments discussed herein may be adapted to facilitate exchange of contact information between transaction participants in response to biometric scans initiated by each participant via their respective mobile devices.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Thus, the present invention has been described herein with reference to particular embodiments for particular applications. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. A system comprising:
   a bio scanner adapted to provide a first signal;
   a first location determination mechanism adapted to facilitate determining a first location of a device coupled to the bio scanner;
   a server system at a second location, wherein the server system is adapted to receive the first signal and first location information characterizing the first location; and
   machine-readable instructions adapted to trigger transfer of data from a third location to a fourth location in response to receipt of the first signal by the server system, wherein the third location is characterized by a first database that includes financial account information that is associated with a user of the bio scanner, and wherein the fourth location is characterized by a second database that includes financial account information of an entity that is associated with a region within which the bio scanner resides as indicated when the location information characterizing the first location is positioned approximately within or coincident with the region.

2. The system of claim 1, wherein the first location determination mechanism includes a positioning system receiver system configured to facilitate determining microlocation information characterizing the first location, the mobile computing device further including:
   first means for transmitting the microlocation information to the server system in response to biometric information derived from output of the bio scanner, wherein the server system includes:
      second means for determining a match between a customer using the mobile computing device and a merchant representing the entity by determining that the first location information identifies a first location that is within a location boundary of the region, the region representing a payment region of a merchant outlet, and wherein the payment region is defined at least in part by location information that has been pre-registered with the server system.

3. A system comprising:
   first means for obtaining first location information defining device location region in which a mobile computing device is located based on a determination made at least in part by a positioning system in communication with the mobile computing device, wherein the first location information includes enhanced location information;
   second means for registering second location information defining one or more boundaries of a pre-defined payment region of a merchant outlet;
   third means for limiting one mobile computing device or customer into the predefined payment region at a given time to complete a transaction;
   fourth means for using the second location information and the first location information to match financial account information of the user of the mobile computing device with financial account information of a merchant of the merchant outlet; and
   fifth means for triggering initiation of a funds transfer between a financial account of the user and a financial account of the merchant to implement a funds transfer therebetween in response to the match and in accordance with a transaction total.

4. The system of claim 3, further including:
   sixth means for employing the enhanced location information to match a transaction to be implemented with a merchant that is associated with the enhanced location information by virtue of the enhanced location information indicating that the mobile computing device is within the payment region, wherein the combination of the second location information and the first location information is sufficiently precise to allow resolving one mobile computing device associated with a customer of the merchant within boundaries of the payment region; and
   seventh means for automatically triggering a matching of the user financial account information and the merchant financial account information with a transaction total, automatically in response to receipt of biometric information identifying the user and a preselected financial account of the user, wherein the financial account of the user is associated with the biometric information, and wherein the user preselected financial account is further associated with the first location information and the transaction total, and wherein the biometric information acts as both a means for authenticating a user of the mobile computing device and a means for selecting a user account that has been pre-associated with the biometric information.

5. The system of claim 3, wherein the first location information includes microlocation information, and wherein the microlocation information is characterized by sufficient resolution to locate the mobile computing device within a sufficiently small region to enable determining that the mobile computing device is within the payment region during implementation of a transaction, and wherein the second location information characterizing the payment region has been pre-registered with a network-coupled system for use in completing one or more transactions and for identifying a particular merchant and a particular payment region that is associated with a particular transaction and transaction total, and wherein the second location information includes different location information for defining different payment regions within a single merchant outlet, the different payment regions pre-registered with the system, and wherein the system further includes:
   eighth means for using pre-registered location information, the first location information, and biometric information to automatically both authenticate a user and match one or more financial accounts of the user, which have been pre-associated with a submitted biometric, with one or more financial accounts of the merchant, and wherein the first location information is included in a signal delivered from the mobile computing device to the system.

6. A method comprising:
   receiving a first signal from a first device that is positioned at a first location, wherein the first device includes a biometric scanner adapted to scan biometric information of a first user and to use scanned biometric information to facilitate generating the first signal, wherein the first signal includes biometric information and first location information characterizing the first location;

employing the first signal to match information associated with the first user to information associated with a second user based on the information associated with the second user, resulting in a match in response thereto, wherein the information associated with the second user includes second location information characterizing one or more regions that have been registered by the second user with a database; and exchanging information between a first portion of a database associated with the first user and a second portion of a database associated with a second user in response to the match,
wherein information exchanged between the first portion of the database and the second portion of the database includes financial account information and a transaction total pertaining to an amount of funds to be transferred from a financial account of the first user to a financial account of second user in response to the first user submitting to a biometric scan via the first device at the first location when the first location is within the one or more regions as indicated by a comparison of the first location information with the second location information;

wherein the second user includes a merchant;

wherein the first user includes a customer of the merchant;

wherein the second location information includes information characterizing one or more regions within a property boundary used by the merchant to conduct commerce;

wherein the one or more regions represent one or more payment regions; and wherein a payment region of the one or more payment regions includes a mechanism adapted to facilitate limiting a number of customers entering the payment region.

7. The method of claim 6, wherein each customer in the payment region is associated with a transaction amount representing a total price for one or more items to be purchased by the customer of the merchant.

* * * * *